United States Patent
Lim

(10) Patent No.: US 9,357,442 B2
(45) Date of Patent: May 31, 2016

(54) COMMUNICATION METHOD AND APPARATUS FOR SUPPORTING MULTIPLE WIRELESS COMMUNICATION TECHNOLOGIES

(71) Applicant: Samsung Electronics Co., Ltd., Suwon-si, Gyeonggi-do (KR)

(72) Inventor: Chaeman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/513,677

(22) Filed: Oct. 14, 2014

(65) Prior Publication Data

US 2015/0105120 A1    Apr. 16, 2015

(30) Foreign Application Priority Data

Oct. 14, 2013   (KR) ................. 10-2013-0122266

(51) Int. Cl.
| | |
|---|---|
| *H04M 1/00* | (2006.01) |
| *H04W 36/00* | (2009.01) |
| *H04B 1/00* | (2006.01) |
| *H04W 88/06* | (2009.01) |
| *H04W 68/00* | (2009.01) |

(52) U.S. Cl.
CPC ......... *H04W 36/0022* (2013.01); *H04B 1/0064* (2013.01); *H04W 68/005* (2013.01); *H04W 88/06* (2013.01)

(58) Field of Classification Search
CPC . H04W 36/0022; H04W 88/06; H04B 1/0064
USPC ........................................................ 455/552.1
See application file for complete search history.

(56) References Cited

U.S. PATENT DOCUMENTS

| | | | |
|---|---|---|---|
| 2002/0147014 A1* | 10/2002 | Atarius | H04W 36/18 455/436 |
| 2006/0234658 A1* | 10/2006 | Sue | G01S 19/36 455/133 |
| 2012/0264473 A1 | 10/2012 | Mujtaba et al. | |
| 2012/0282975 A1 | 11/2012 | Mujtaba et al. | |
| 2013/0230080 A1* | 9/2013 | Gudem | H04B 1/0057 375/219 |
| 2014/0185498 A1* | 7/2014 | Schwent | H04B 1/0057 370/297 |
| 2014/0273884 A1* | 9/2014 | Mantravadi | H04B 1/38 455/73 |
| 2014/0342678 A1* | 11/2014 | Khlat | H04B 1/44 455/78 |

* cited by examiner

*Primary Examiner* — Tanmay Shah
(74) *Attorney, Agent, or Firm* — Jefferson IP Law, LLP

(57) ABSTRACT

A communication apparatus is provided. The communication apparatus includes a first antenna configured to transmit and receive at least one of a signal of a first communication network and a signal of a second communication network, a second antenna configured to receive one of the signal of the first communication network and the signal of the second communication network, a first diplexer connected to the first antenna to separate the signal that is received through the first antenna into a high-band signal and a low-band signal based on a specific frequency and to output the separated signals, and a signal control unit configured to change communication paths of the high-band signal, the low-band signal, and the signal that is received through the second antenna according to a combination of frequency bands supported in a network.

24 Claims, 13 Drawing Sheets

COMMUNICATION METHOD AND APPARATUS FOR SUPPORTING MULTIPLE WIRELESS COMMUNICATION TECHNOLOGIES

CROSS-REFERENCE TO RELATED APPLICATION(S)

This application claims the benefit under 35 U.S.C. §119(a) of a Korean patent application filed on Oct. 14, 2013 in the Korean Intellectual Property Office and assigned Serial number 10-2013-0122266, the entire disclosure of which is hereby incorporated by reference.

TECHNICAL FIELD

The present disclosure relates to a communication method and apparatus for supporting communications with respect to multiple communication service signals provided from a network.

BACKGROUND

Currently, with the development of wireless communication services, a number of available frequencies of the communication services have increased from one band to multiple bands, and there has been an increasing demand for an integrated terminal that uses multi-band/multi-mode/multi-path. Currently, an electronic device that supports wireless communication has been developed in a form in which several communication networks are simultaneously supported. For example, a communication service, in which a Circuit Switching (CS) network that provides a voice call service and a Packet Switching (PS) network (e.g., data service through LTE) that provides a data transmission/reception service coexist, has been provided.

The above information is presented as background information only to assist with an understanding of the present disclosure. No determination has been made, and no assertion is made, as to whether any of the above might be applicable as prior art with regard to the present disclosure.

SUMMARY

In order to support a voice service in a data service through a Long Term Evolution (LTE) network, various types of services, such as Simultaneous Voice and LTE (SVLTE), Simultaneous GSM and LTE (SGLTE), CS Fallback (CSFB), Single Ratio LTE (SR LTE), and Single Radio Voice Call Continuity (SRVCC), have been used.

Further, as the standards, such as LTE and Wi-Fi (IEEE 802.11ac) use multiple frequency bands, a communication apparatus is provided with a Front End Module (hereinafter referred to as "FEM") to increase high-capacity data throughput. The FEM means a module in which a reverse switch, a Power Amplifier (hereinafter referred to as "PA"), and a filter of an RF transmission/reception module in a mobile communication or wireless communication apparatus are miniaturized using an integration technology. The FEM occupies a position as one of components that play main roles, such as filtering and amplifying of transmitted/received signals, in addition to a simple reverse switch function. In particular, with the development of communication apparatuses that mount high-speed multi-band wireless functions thereon, there has been a need for development of the FEM in the form of an integrated module to support various communication services.

Aspects of the present disclosure are to address at least the above-mentioned problems and/or disadvantages and to provide at least the advantages described below. Accordingly, an aspect of the present disclosure is to provide a communication method and apparatus that may match various types of communication services through variable change of communication paths according to a combination of frequency bands of a received signal through the FEM.

In accordance with an aspect of the present disclosure, a communication apparatus is provided. The communication apparatus includes a first antenna configured to transmit and receive at least one of a signal of a first communication network and a signal of a second communication network, a second antenna configured to receive one of the signal of the first communication network and the signal of the second communication network, a first diplexer connected to the first antenna and configured to separate the signal that is received through the first antenna into a high-band signal and a low-band signal based on a specific frequency and to output the separated signals, and a signal control module configured to change communication paths of the high-band signal, the low-band signal, and the signal that is received through the second antenna according to a combination of frequency bands supported in a network.

In accordance with another aspect of the present disclosure, a communication method is provided. The communication method includes confirming a combination of frequency bands of networks that provide services of different communication types, and setting to change communication paths of a high-band signal and a low-band signal that are separated from a signal received through a first antenna and a signal received through a second antenna.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
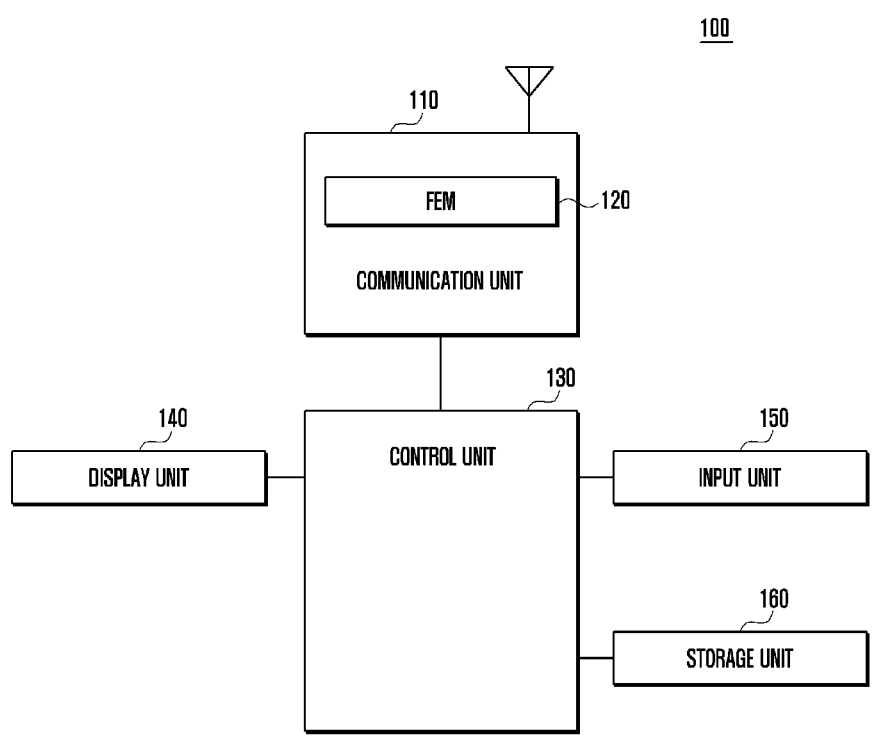
FIG. 1 is a block diagram illustrating an electronic device that includes a communication apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A communication apparatus according to various embodiments of the present disclosure may be a device that is included in an electronic device. The electronic device may be, for example, one or a combination of various devices, such as a smart phone, a tablet Personal Computer (PC), a mobile phone, a video phone, an e-book reader, desktop Personal Computer (PC), a laptop Personal Computer (PC), a net book computer, a Personal Digital Assistant (PDA), a Portable Multimedia Player (PMP), a Motion Picture Expert Group (MPEG-1 or MPEG-2) Audio Layer 3 (MP3) player, a mobile medical device, an electronic anklet, an electronic necklace, an electronic appcessory, a camera, a wearable device, an electronic clock, a wrist watch, a smart white appliance (e.g., a refrigerator, an air conditioner, a cleaner, an artificial intelligent robot, a TV, a Digital Video Disk (DVD) player, an audio player, an oven, a microwave oven, a washing machine, an air purifier, and a digital frame), various kinds of medical devices (e.g., Magnetic Resonance Angiography (MRA), Magnetic Resonance Imaging (MRI), Computer tomography (CT), radiography, ultrasound machine, navigation device, Global Positioning System (GPS) receiver, an Event Data Recorder (EDR), a Flight Data Recorder (FDR) a set-top box, a TV box (e.g., Samsung HomeSync™, Apple TV™, or Google TV™), an electronic dictionary, an automobile infotainment device, electronic equipment for ship (e.g., navigation device for ship or gyrocompass), avionics, a secure device, e-clothes, an electronic key, a camcorder, a game console, Head-Mounted Display (HMD), a flat panel display device, an electronic album, furniture or a part of a building/structure including a communication function, an electronic board, an electronic signature receiving device, and a projector. It is apparent to those skilled in the art that the electronic device according to the present disclosure is not limited to the above-described devices.

FIG. 1 is a block diagram illustrating an electronic device that includes a communication apparatus according to various embodiments of the present disclosure.

Referring to FIG. 1, an electronic device 100 according to various embodiments of the present disclosure may include a communication unit 110, a control unit 130, a display unit 140, an input unit 150, and a storage unit 160, but is not limited thereto.

The communication unit 110 performs communication, such as voice communication, video communication, or data communication, with a supportable mobile communication network through a communication channel under the control of the control unit 130. The communication unit 110 may be driven according to a user's request for communication functions, set schedule information, or an external request. The communication unit 110 may output or receive a communication signal in a driving process.

The communication unit 110 may include a Front End Module (FEM) 120 that performs filtering and amplifying of a transmitted/received signal and processes the communication signal. According to various embodiments, the FEM 120 may be in a configuration that may control signal processing modules, such as a reverse switch, a filter, and a power amplifier (not illustrated). The FEM 120 may be set to change at least one communication path of signals of different communication types, for example, a signal of a first communication network and a signal of a second communication signal, according to a combination of frequency bands of the signals that are supported by a communication network system. The configuration and the operation of the FEM 120 according to various embodiments will be described in detail with reference to FIGS. 2 to 13.

The control unit 130 controls the whole operation of the electronic device 100 and a signal flow between internal blocks of a terminal, and performs data processing function to process data. The control unit 130 may control power supply from a battery to internal configurations. If the power is supplied, the control unit 130 may control the booing process of the terminal and execute various kinds of application programs stored in a program region to execute a function according to a user's setting. The control unit 130 may include at least one Application Processor (AP) or at least one Communication Processor (CP).

The display unit 140 may display information input by a user or information provided to the user in addition to various kinds of menus of the terminal. Under the control of the control unit 130, the display unit 140 may output various function execution screens according to execution of work functions. The display unit 140 may be implemented by a touch screen on which a touch panel and a display panel overlap each other. Accordingly, the display unit 140 may operate as an input means. The display unit 140 may include, for example, a Liquid Crystal Display (LED) panel or an Active-Matrix Organic Light-Emitting Diode (AM-OLED) panel.

The input unit 150 may generate various input signals required to operate the terminal. The input unit 150 may generate signals related to the user's setting and function control of the terminal to transfer the generated signals to the control unit 130. The control unit 130 may control the function according to the corresponding input signal in response to such a key signal. The input unit 150 may include a touch panel, a pen sensor, and a key.

The storage unit 160 may store commands or data that are received from the control unit 130 or other constituent elements (e.g., the display unit 140, the input unit 150, and the communication unit 110) or that are generated by the control unit 130 or other constituent elements. The storage unit 160 may store the Operating System (OS) for booting of the electronic device and operation of the above-described configurations, at least one application program, messages that are transmitted/received through the network, and data according to the application execution.

According to various embodiments of the present disclosure, the communication apparatus (e.g., RF communication apparatus) that includes the FEM module is exemplified, but the communication apparatus according to various embodiments is not limited thereto. The communication apparatus according to the present disclosure may include two or more of wireless communication modems having different connection types, such as a Global System for Mobile communication (GSM) modem, a Code Division Multiple Access (CDMA) modem, a Wideband Code Division Multiple Access (WCDMA) modem, a World interoperability for Microwave Access (WiMAX) modem, a Time Division Synchronous Code Division Multiple Access (TD-SCDMA) modem, a High Speed Packet Access (HSPA) modem, an evolved High Speed Packet Access (HSPA+) modem, and a Wi-Fi modem, or may include an adaptive wireless communication modem that supports at least two different wireless communication types. The communication apparatus according to various embodiments of the present disclosure may variably change communication paths for signal processing according to a combination of frequency bands of signals that are provided from the network system through antennas. Accordingly, the communication apparatus may maximize the performance of data communication and paging reception through configuring of different operations by network conditions to provide various types of communication networks that are different from each other.

Figure 2:
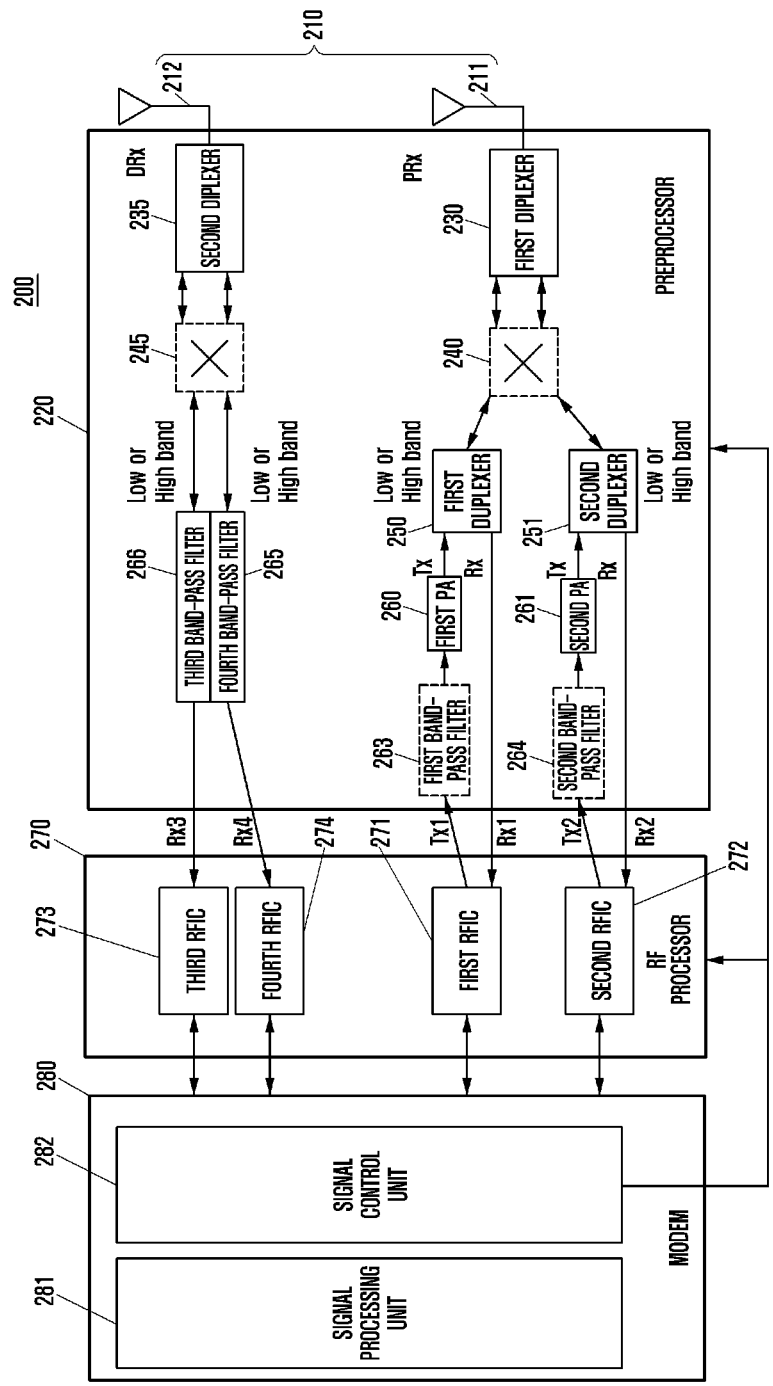
FIG. 2 is a block diagram illustrating the configuration of a communication apparatus according to various embodiments of the present disclosure.

FIG. 2 is a block diagram illustrating the configuration of a communication apparatus according to various embodiments of the present disclosure.

Referring to FIG. 2, a communication apparatus 200 according to an embodiment of the present disclosure may include an antenna 210, a preprocessor 220, an RF processor 270, and a modem 280.

The antenna 210 may include a first antenna 211 and a second antenna 212. The first antenna 211 may be a transmission/reception antenna that transmits/receives at least one of the signal of the first communication network and the signal of the second communication network, or simultaneously or sequentially transmits or receives the signal of the first communication network and the signal of the second communication network. The first antenna 211 may be connected to a front end of a first diplexer 230. An output port of the first diplexer 230 may be connected to a front end of a first reverse switch 240. The first reverse switch 240 may be connected to front ends of a first duplexer 250 and a second duplexer 251.

The second antenna 212 may be a reception antenna that simultaneously or sequentially receives the signal of the first communication network and the signal of the second communication network. The second antenna 212 may be connected to a front end of a second diplexer 235, and an output port of the second diplexer 235 may be connected to a front end of a second reverse switch 245.

According to an embodiment, the first antenna 211 may be a main antenna, and the second antenna 212 may be a sub-antenna of the first antenna 211 or a diversity antenna. The first antenna 211 and the second antenna 212 may be implemented in one antenna shape by hardware.

According to an embodiment, the first communication network may be, for example, a PS network that uses a transmission technology, such as Long Term Evolution (LTE) or mobile wimax. A broadcasting signal or a multicast signal may be received in the communication apparatus through such a PS network. The broadcasting signal or multicast signal of the PS network (e.g., signal that is received through a Multicast Channel (MCH) of the LTE) and a data communication signal of the PS network (e.g., signal that is receive through a Downlink-Shared Channel (DL-SCH) of the LTE) may have the same frequency band, and may be transmitted from a base station to a terminal (e.g., communication apparatus) in a Time Division (TD) manner. For example, the data communication signal of the PS network may be a data communication signal (e.g., unicast) that is transmitted to a specific person, and the broadcasting signal of the PS network may be a broadcasting signal (i.e., broadcast) that is transmitted to an unspecified number of the general public. The multicast signal of the PS network may be a multicast signal (i.e., multicast) that is transmitted to a specified number of the general public.

The second communication network may be, for example, a CS network that adopts a transmission technology, such as Code Division Multiple Access (CDMA), Wideband Code Division Multiple Access (WCDMA), or Global System for Mobile communication (GSM).

According to an embodiment, the first communication network may be a CS network, and the second communication network may be a PS network. The communication apparatus according to various embodiments of the present disclosure may be applied to all communication networks that use different transmission technologies.

The preprocessor 220 may include a first diplexer 230, a first reverse switch 240, a second reverse switch 245, a second diplexer 235, a first duplexer 250, a second duplexer 251, a plurality of amplifiers (a first PA 260 and a second PA 261), and a plurality of band-pass filters (a first band-pass filter 263, a second band-pass filter 264, a third band-pass filter 266, and a fourth band-pass filter 265).

The first diplexer 230 and the second diplexer 235 may be configured to separate a signal having at least two different frequency bands into at least two signals based on a specific frequency (e.g., 1 GHz). The first diplexer 230 and the second diplexer 235 may separate a high-band signal and a low-band signal using a Low-Pass Filter (LPF) and a High-Pass Filter (HPF), respectively, to strengthen the isolation characteristics between the different bands. The first diplexer 230 and the second diplexer 235 commonly call the devices having the above-described functions.

According to an embodiment, the first diplexer 230 and the second diplexer 235 may separate the signal that is received through at least one of the first antenna and the second antenna into high and low frequency bands. In an embodiment, the high-band signal may be a signal having a relatively higher frequency band than 1 GHz, and the low-band signal may be a signal having a relatively lower frequency band than 1 GHz, but are not limited thereto.

The first reverse switch 240 and the second reverse switch 245 may be configured to reversely output the signals that are separated by the first diplexer 230 and the second diplexer 235. The first reverse switch 240 and the second reverse switch 245 may operate or may not operate according to a combination of frequency bands of the communication signal through a signal processing unit 281. The first reverse switch 240 and the second reverse switch 245 may be configured by Double Pole Double Throw (DPDT). An output terminal of the first reverse switch 240 may be connected to front ends of the first duplexer 250 and the second duplexer 251, and an output terminal of the second reverse switch 245 may be connected to front ends of the third and fourth band-pass filters 266 and 265.

The first reverse switch 240 may output the signal that is separated through the first diplexer 230 to one of the first duplexer 250 and the second duplexer 251. The second reverse switch 245 may output the signal that is separated through the second diplexer 235 to one of the two band-pass filters 265 and 266.

FIG. 2 illustrates the first reverse signal 240 and the second reverse signal 245. However, in a certain embodiment, the first reverse switch 240 and the second reverse switch may be omitted. If the first reverse switch 240 and the second reverse switch 245 are omitted, the first diplexer 230 may be connected to the first duplexer 250 and the second duplexer 251, and the second diplexer 235 may be connected to the third band-pass filter 266 and the fourth band-pass filter 265.

According to an embodiment, the first diplexer 230 may be set to output a low-band signal to the second duplexer 251. In this case, a second Radio Frequency Integrated Circuit (RFIC) 272 that is connected to the second duplexer 251 may be fixed to support only a specific communication type (e.g., GSM or LTE).

For example, if a low-band LTE signal is received through the first antenna 211, the low-band LTE signal may be output in the direction of the second duplexer 251 through the first diplexer 230 and the second reverse switch 240. In contrast, if a high-band LTE signal is received through the first antenna 211, the signal processing unit 281 may control the first reverse signal 240 so that the high-band LTE signal that is separated through the first diplexer 230 is not output to an output terminal that is connected to the first duplexer 250, but is output to an output terminal that is connected to the second duplexer 251.

The first duplexer 250 and the second duplexer 251 may be configured to separate a transmission terminal and a reception terminal of the signal. The first duplexer 250 and the second duplexer 251 may separate a downlink RF signal and an uplink signal from each other to prevent communication crosstalk. The first duplexer 250 and the second duplexer 251 may be connected to an amplifier and a band-pass filter.

A plurality of amplifiers 260 and 261 may be configured to low-noise-amplify the downlink RF signal or to power-amplify the uplink RF signal. The plurality of band-pass filters 263, 264, 265, and 266 may be configured to pass a desired specific frequency band signal. The band-pass filter may include a Surface Acoustic Wave (SAW) filter, but is not limited thereto.

The plurality of amplifiers 260 and 261 and the plurality of band-pass filters 263, 264, 265, and 266, which are included in the preprocessor 220, may be arranged to have a structure as illustrated in FIG. 2, but are not limited thereto. The constituent elements of the preprocessor 220 may be arranged in various structures according to the setting of the communication paths.

According to an embodiment, reception terminals of the first duplexer 250 and the second duplexer 251 may be connected to the RF processor 270, and band-pass filters and amplifiers may be arranged between transmission paths Tx1 and Tx2 of the RF processor 270, the first duplexer 250, and the second duplexer 251. Two band-pass filters 265 and 266 may be arranged between the second reverse switch 245 and the RF processor 270. According to a certain embodiment, at least one band-pass filter may be omitted, and in this case, the input terminal and the output terminal of the correspond band-pass filter may be connected to each other.

According to an embodiment, the communication signals that are separated into high/low frequency bands may be received in the first main path Rx1 and Tx1 connected to the output terminal of the first duplexer 250 through the first diplexer 230, or may be received in the second main path Rx2 and Tx2 connected to the output terminal of the second duplexer 251 through the first diplexer 230.

The communication signal that is received through the second antenna 212 may be received in a first sub-path Rx3 connected to the third band-pass filter 266 through the second diplexer 235, or may be received in a second sub-path Rx4 connected to the fourth band-pass filter 265 through the second diplexer 235.

According to an embodiment, the first main path Rx1 and Tx1 may be a transmission/reception path allocated to one of the high-band signal and the low-band signal, and the second main path Rx2 and Tx2 may be a transmission/reception path allocated to one of the high-band signal and the low-band signal. Further, the first sub-path Rx3 may be a reception path allocated to one of the high-band signal and the low-band signal, and the second sub-path Rx4 may be a reception path allocated to the high-band signal and the low-band signal.

As an example, if the first main path is a high-band transmission/reception path, the second main path may be a low-band transmission/reception path, and if the first sub-path is a high-band reception path, the second sub-path may be a low-band reception path.

As another example, if the first main path is a low-band transmission/reception path, the second main path may be a high-band transmission/reception path, and if the first sub-path is a low-band reception path, the second sub-path may be a low-band reception path.

The RF processor 270 may be configured to include a plurality of RFICs (e.g., a first RFIC 271, a second RFIC 272, a third RFIC 273, and a fourth RFIC 274. The RF processor 270 may be configured to convert an RF signal into an analog signal or to convert an analog signal into an RF signal. The RF processor 270 may include at least one of a transmission/reception module (e.g., transceiver), a reception module (e.g., receiver), a low-noise amplifier, a mixer, a drive amplifier, and a Radio Access Technology (RAT) common or dedicated module. Here, the RAT common or dedicated module may be configured to support an access to various RAT networks, such as a Frequency Division Duplex (FDD) network, a Time Division Duplex (TDD) network, and a Wireless LAN (WLAN).

According to an embodiment, the first RFIC 271 may be configured to process a signal that is transmitted/received through the first main path, and the second RFIC 272 may be configured to process a signal that is transmitted/received through the second main path. Further, the third RFIC 273 may process a signal that is received through the first sub-path, and the fourth RFIC 274 may process a signal that is received through the second sub-path, but are not limited thereto.

On the other hand, it is illustrated that the RF processor 270 according to an embodiment of the present disclosure is so configured that separate RFICs process the signals that are received through the main paths and the sub-paths, but is not limited thereto. The RF processor 270 may be configured as a combination of at least one RFIC.

According to an embodiment, the RF processor 270 may include at least one RFIC. In this case, the at least one RFIC may be connected to four communication paths (e.g., the first main path, the second main path, the first sub-path, and the second sub-path) to process the transmitted/received signals. Here, the RF processor 270 including one RFIC may support both the communication technology according to the first communication type and the communication technology according to the second communication type.

According to an embodiment, the RF processor 270 may include two RFICs. For example, one RFIC may be connected to the first main path and the first sub-path to process the signal, and the other RFIC may be connected to the second main path and the second sub-path to process the signal. Here, if one RFIC is configured to support the communication technology according to the first communication type, the other RFIC may be configured to support the communication technology according to the second communication type.

As another example, one RFIC may be connected to three communication paths (a combination of three paths selected from the first main path, the second main path, the first sub-path, and the second sub-path) to process the signals. The other RFIC may be connected to one communication path to process the signal. Here, the RFIC that is connected to the three communication paths may be configured to support both the communication technology according to the first communication type and the communication technology according to the second communication type, and the other RFIC may be configured to support one communication technology according to the first communication type or the second communication type.

The position of the modem 280 is registered through camping on the first communication network and the second communication network, and serves to perform data communication. The modem 280 may be configured to include a signal processing unit 281 and a signal control unit 282.

The signal processing unit 281 is configured to demodulate an analog signal that is received from the RF processor 270 into a digital signal or to modulate a digital signal into an analog signal to output the modulated analog signal to the RF processor.

It is illustrated that the signal processing unit 281 is configured as one modem that supports a plurality of communication systems (e.g., a CS network communication system (e.g., CDMA system, GSM system, and WCDMA system) and a PS network communication system (e.g., LTE system)), but is not limited thereto. According to various embodiments, the signal processing unit 281 may be configured as individual modems that support the respective communication networks.

The signal control unit 282 is configured to set the communication paths according to the combination of frequency bands of the signals supported in the network and to control the communication modules to process the signals. The signal control unit 282 may confirm the combination of frequency bands of the signals supported in a plurality of networks, and may control the communication paths to simultaneously process the signals of the different frequency bands or to preferentially process the signal of a specific frequency band.

In various embodiments of the present disclosure, it is described that the communication network supports the PS network (e.g., LTE network) that must support two reception paths 2 Rx and the CS network (GSM network or CDMA network), but is not limited thereto.

According to an embodiment, if the combination of the frequency bands supported in the network corresponds to the first communication network of high band and the second communication network of low band, the signal of the first communication network may be transmitted/received through the first main path Rx1 and Tx1 that passes the first duplexer 230. The signal of the second communication network may be transmitted/received through the second main path Rx2 and Tx2 that passes the second duplexer 240. In this case, if one of the first communication network and the second communication network should support two paths Rx, the signal of the first communication network may be received through the first sub-path Rx3 that is formed through the second antenna 212.

According to an embodiment, if the combination of the frequency bands supported in the network corresponds to the first communication network of high band and the second communication network of high band, the signal of the first communication network is received through the first main path Rx1 and Tx1 and the first sub-path Rx3, and paging for the second communication network is periodically monitored through the second antenna 212. If a paging signal is received, the signal of the second communication network may be received through the first main path Rx1 and Tx1, or may be transmitted/received using the first main path Rx1 and Tx1 and the sub-path.

On the other hand, the above-described communication apparatus may support a network that provides a Carrier Aggregation (CA) service for a specific communication network. The CA communication service means a communication technology that makes it possible to use a relatively wider frequency bandwidth than the existing frequency bandwidth through tying up and simultaneously using different frequency bands.

According to an embodiment, in a case of a communication apparatus that provides a CA service for a specific communication network, the communication signal (e.g., LTE signal) that is received through the first antenna 211 may be separated into high/low frequency bands through the first diplexer 230, and may be received through the first main path Rx1 and Tx1 output to the first duplexer 250 or through the second main path Rx2 and Tx2 output to the second duplexer 251.

The communication signal (e.g., LTE signal) that is received through the second antenna 212 may be separated into high/low frequency bands through the second diplexer, and may be received through the first sub-path Rx3 output to the third band-pass filter or through the second sub-path Rx4 output to the fourth band-pass filter.

Figure 3:
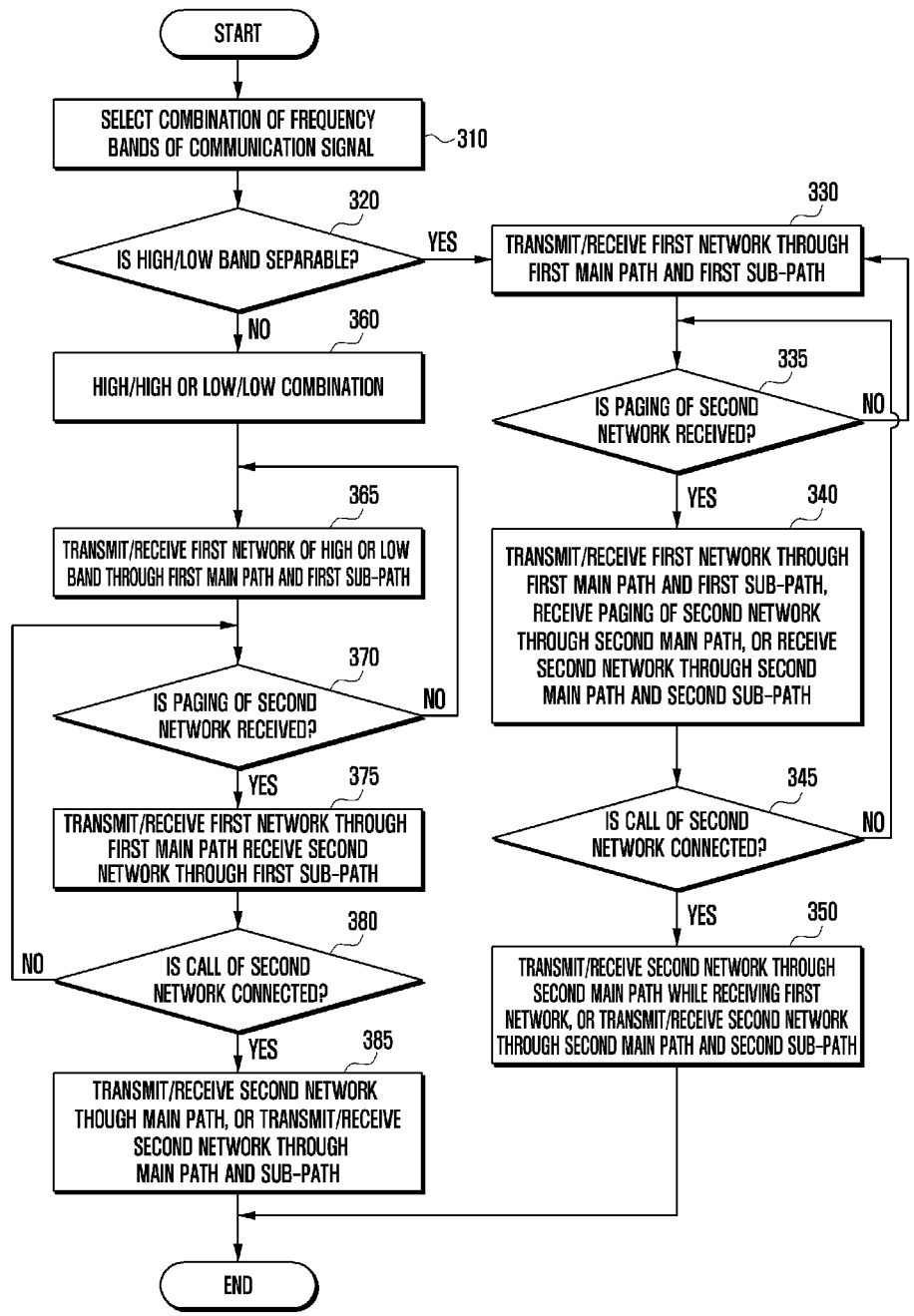
FIG. 3 is a flowchart illustrating a communication setting method of a communication apparatus according to various embodiments of the present disclosure.

FIG. 3 is a flowchart illustrating a communication setting method of a communication apparatus 200 according to various embodiments of the present disclosure.

Referring to FIG. 3, at operation 310, the communication apparatus 200 may select a combination of frequency bands of a communication signal. Here, the frequency bands may be frequency bands supported in a communication network that provides a communication service.

According to an embodiment, the frequency bands may be frequency bands of signals of a first communication network that supports a data service and a second communication network that supports voice and data services. For example, if a communication network supported in a PS network (e.g., LTE) does not support the voice service and another CS network should be used to support the voice service, the frequency bands of the communication signal may be composed of a combination of a frequency band used in the PS network and a frequency band used in the CS network.

According to various embodiments, the communication apparatus may determine the combination of frequency bands for the communication network based on information stored in a Subscriber Identity Module (SIM).

According to various embodiments, the communication apparatus may determine the combination of the frequency bands of the communication network that may be supported in the corresponding communication apparatus through confirming of all frequencies that correspond to a plurality of communication networks (or base stations).

At operation 320, the communication apparatus may determine whether it is possible to separate the combination of the frequency bands into high/low bands. At operation 330, if it is possible to separate the combination of the frequency bands into high/low bands, the communication apparatus may receive the signal of the first communication network through the first main path Rx1 and Tx1 and the first sub-path Rx3. According to an embodiment, the first communication network may be a PS network that requires a diversity gain, and the second communication network may be a CS network, but are not limited thereto.

On the other hand, the communication apparatus may simultaneously receive signals of the second communication network using the second main path Rx2 and Tx2 through the first antenna. In this case, the communication apparatus may receive a paging signal of the second communication network through the first antenna.

At operation 335, the communication apparatus may confirm whether the paging signal of the second communication network is received. At operation 340, if the paging signal of the second communication network is received, the communication apparatus may receive the paging of the second communication network while maintaining a connection state of the first communication network through the second main path Rx2 and Tx2.

According to an embodiment, the communication apparatus may transmit/receive or receive at least one of signals of the first communication network and the second communication network and the paging signal using two main paths (two Rx and two Tx) and one sub-path (one Rx). For example, the communication apparatus may receive the paging signal of the second communication network using the second main path Rx2 and Tx2 through the first antenna while transmitting/receiving the signal of the first communication network through the first main path Rx1 and Tx1 and the first sub-path Rx3.

According to an embodiment, the communication apparatus may receive at least one of signals of the first communication network and the second communication network and the paging signal using two main paths (two Rx and two Tx) and two sub-paths (two Rx). For example, the first communication apparatus may receive the paging signal of the second communication network through the second main path Rx2 and Tx2 and the second sub-path Rx4 while transmitting/receiving the signal of the first communication network through the first main path Rx1 and Tx1 and the first sub-path Rx3.

Here, the communication apparatus may determine that the paging signal of the second communication network has priority to the signal of the first communication network. If the paging signal of the second communication network is not received, the communication apparatus may return to operation 330.

At operation 345, the communication apparatus determines whether to connect a call based on the second communication network. At operation 350, if the communication apparatus connects a call in response to the paging signal, the communication apparatus may transmit/receive a phone call connection signal from the second main path Rx2 and Tx2 through the first antenna while receiving the first communication network signal through the first main path and the second sub-path. Further, the communication apparatus may transmit/receive a phone call connection signal using the second main path Rx2 and Tx2 and the first sub-path Rx3 through the second antenna. On the other hand, if the call based on the second communication network is not connected, the communication apparatus may return to operation 335.

On the other hand, if the combination of the frequency bands is unable to be separated into high/low bands, the communication apparatus may enter into operation 360 to determine that the combination of the frequency bands is the combination of the high/high or low/low frequency bands.

At operation 365, the communication apparatus may transmit/receive the signal of the first communication network that is one of high and low bands through the first main path Rx1 and Tx1 and the sub-path Rx3.

According to an embodiment, the first communication network Rx1 and Tx1 may be a high-band PS network or a low-band PS network. If the first communication network is of high band, the second communication network may be a high-band CS network, and if the first communication network is of low band, the second communication network may be a low-band CS network.

At operation 370, the communication apparatus may confirm whether the paging signal of the second communication network is received. At operation 375, the communication apparatus may monitor the paging signal of the second communication network through the first sub-path Rx3 while maintaining the connection state of the first communication network through the first main path Rx1 and Tx1 and the first sub-path Rx3.

For example, the communication apparatus may monitor the second communication network for a predetermined time in a predetermined period T to receive the paging signal of the second communication network while receiving the signal of the first communication network through the second antenna. The communication apparatus may control a reverse switch to variably receive and process the signal of the first communication network and the signal of the second communication network for monitoring of the second communication network.

For example, the communication apparatus may receive the signal of the CS network or the signal of the PS network through changing of a reception mode of the second antenna. As another example, in a case of serving the signal of the PS network in a time division manner, the communication apparatus may receive the signal of the CS network in a section where the signal of the PS network is not received through the second antenna.

At operation 380, the communication apparatus may determine whether to connect a call based on the second communication network. At operation 385, in a case of connecting a call in response to the paging signal, the communication apparatus may transmit/receive a phone call connection through the main path or through the main path and the sub-path.

For example, the communication apparatus may transmit/receive the phone call connection through one of the first main path Rx1 and Tx1 and the second main path Rx2 and Tx2. As another example, the communication apparatus may transmit/receive a phone call connection signal through one of two main paths and one of two sub-paths.

Figure 4:
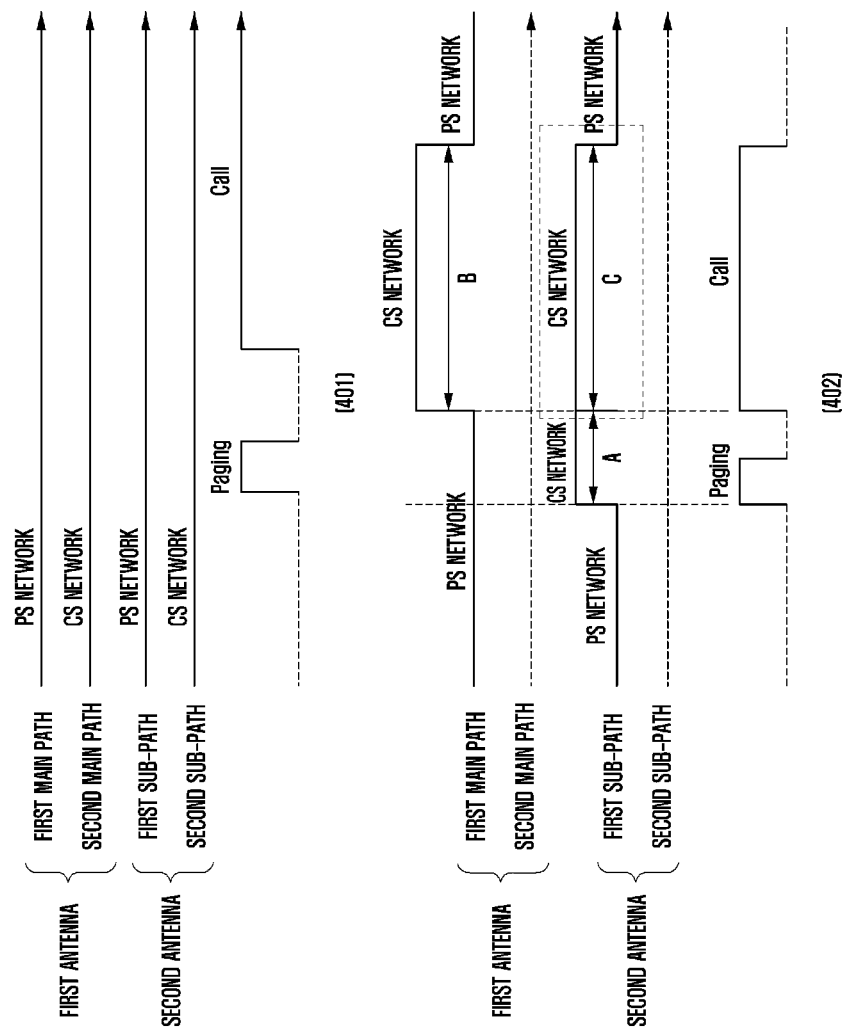
FIG. 4 is a diagram illustrating a signal flow of signals of a first communication network and a second communication network that are received or transmitted/received according to various embodiments of the present disclosure.

FIG. 4 is a diagram illustrating a signal flow of signals of a first communication network and a second communication network that are received or transmitted/received according to various embodiments of the present disclosure.

Hereinafter, a signal flow in a case where the frequency bands correspond to a high/low combination will be described with reference to [401].

According to an embodiment, as illustrated in [401] of FIG. 4, if the frequency bands correspond to the high/low combination, the communication apparatus may receive the signal of the PS network through the first main path Rx1 and Tx1 and the first sub-path Rx3, and may receive the signal of the CS network through the second main path Rx2 and Tx2.

According to an embodiment, if it is set that the communication apparatus uses two sub-paths, the communication apparatus may receive the signal of the PS network through the first main path Rx1 and Tx1 and the first sub-path Rx3, and may receive the signal of the CS network through the second main path Rx2 and Tx2 and the second sub-path Rx4.

For example, the communication apparatus may simultaneously receive the signals of the PS network and the CS network through separation of the signal that is received through the first antenna into high band or low band through the first diplexer. In this case, the communication apparatus may communicate with a network that supports SGLTE or SVLTE service through simultaneous reception of the signal of the PS network and the signal of the CS network. Here, the SGLTE or SVLTE service means a service type that may support only a data service without supporting a voice call in a case of the PS network (e.g., LTE), and may support voice and data services in a case of the CS network.

As another example, the communication apparatus may support a CA service network that simultaneously provides the same communication network of different frequency bands through the second antenna. The CA communication service means a technology that makes it possible to perform communication using a relatively wider frequency bandwidth than the existing frequency bandwidth through tying up and simultaneously using different frequency bands. The communication apparatus may simultaneously receive a first band signal through the first main path Rx1 and Tx1 and the first sub-path Rx3 and a second band signal through the second main path Rx2 and Tx2 and the second sub-path Rx4 with respect to one communication network. In this case, the communication apparatus may monitor the paging signal of another communication network through the second antenna.

In the embodiment of [401], the communication apparatus may receive the paging signal of the CS network using at least one of the second main path Rx2 and Tx2 and the first sub-path Rx3. For example, if a call based on the CS network is connected, the communication apparatus may transmit/receive data through at least one of the second main path Rx2 and Tx2 and the second sub-path. In this case, the communication apparatus may transmit/receive the PS network signal through the first main path Rx1 and Tx1 and the sub-path Rx3, and thus may maintain the diversity gain of the PS network.

Hereinafter, a signal flow in a case where the frequency bands correspond to a high/high or low/low combination will be described with reference to [402].

In an embodiment of [402], the communication apparatus may use two main paths (first and second main paths) and one sub-path, and use two main paths (first and second main paths) and two sub-paths (first and second sub-paths).

According to an embodiment, in a case where the network system supports a frequency band service of the high/high or low/low band combination, the communication apparatus may receive the signal of the PS network through the first main path Rx1 and Tx1 and the first sub-path Rx3. In this case, the communication apparatus may monitor the paging signal of the CS network through the first sub-path Rx3.

For example, the communication apparatus may periodically receive the paging signal of the CS network while receiving the signal of the PS network through the second antenna. The communication apparatus may change a reception mode to receive the paging signal (paging signal of the CS network) being monitored. The communication apparatus may receive the signal of the CS network or the signal of the PS network through changing of the reception mode of the second antenna.

As another example, in a case of serving the signal of the PS network in a time division manner, the communication apparatus may receive the signal of the CS network in a section where the signal of the PS network is not received through the second antenna.

As illustrated in [402], if it is required to receive the paging signal of the CS network while monitoring the paging signal of the CS network through the second antenna, the communication apparatus may receive the signal of the CS network through the sub-path Rx3 as shown in section A. Thereafter, if a call based on the CS network is connected, the communication apparatus may transmit/receive data of the CS network using the first main path Rx1 and Tx1 through the first antenna as shown in the section B. At this time, the communication apparatus may secure the diversity gain through reception of the signal of the CS network through the second antenna (first sub-path) for the section B, or turn off the first sub-path.

On the other hand, in a case of using two main paths (first and second main paths) and two sub-paths (first and second sub-paths), the communication apparatus may monitor the paging signal of the CS network through the second antenna.

For example, the communication apparatus may receive the signal of the PS network through the first sub path or receive the signal of the CS network through the second sub-path. Thereafter, in a case of receiving the signal of the CS network, the communication apparatus may receive the signal of the CS network through the sub-path Rx3 as shown in section A. If a call based on the CS network is connected, the communication apparatus may transmit/receive a call connection signal of the CS network using the first main path Rx1 and Tx1 (section B) and the first sub-path (section C) through the first antenna.

As illustrated in [402], the communication apparatus according to an embodiment may activate or turn off the second sub-path according to a combination of frequency bands. Further, the call connection signal based on the CS network may be transmitted/received through the first main path or may be transmitted/received through the first main path and the first sub-path.

According to an embodiment, the communication apparatus may communicate with a network that provides a CSFB service. The CSFB service means a service in which the PS network (e.g., LTE) is used in a case where only the data transmission/reception is required, and if the paging and voice call are received on the PS network, the PS network is changed to the CS network (e.g., GSM or CDMA) to provide a voice service to a user.

If the network supports CSFB, and a call based on the CS network is connected in a signal flow of 401 and 402, the communication apparatus may transmit/receive only the signal of the CS network through the first antenna. For example, the network that supports CSFB supports the service of the PS network, and if a voice call connection is requested, the network interrupt the service of the PS network, and supports data and voice signal based on the CS network. In this case, the communication apparatus does not receive the PS signal when the voice call is connected, and may transmit/receive the voice signal and data based on the CS network.

Figure 5:
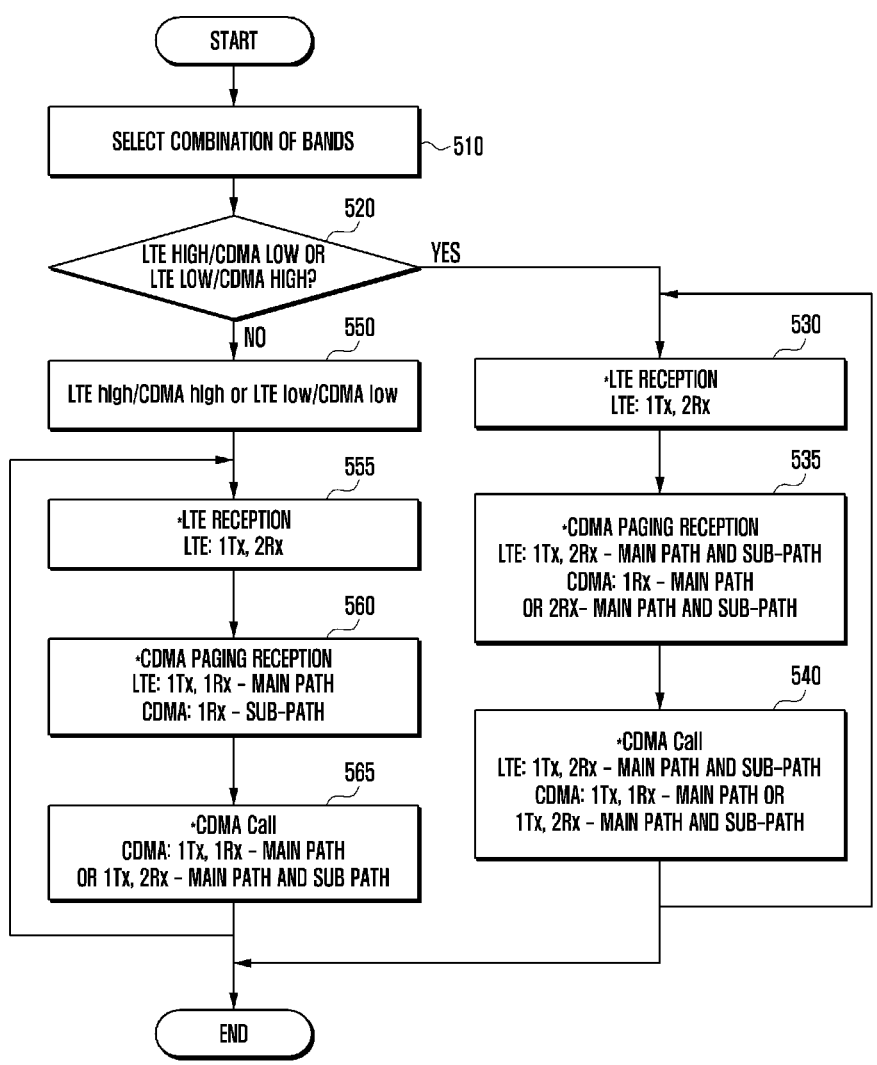
FIG. 5 is a flowchart illustrating a communication setting process of a communication apparatus according to various embodiments of the present disclosure.
Figure 6:
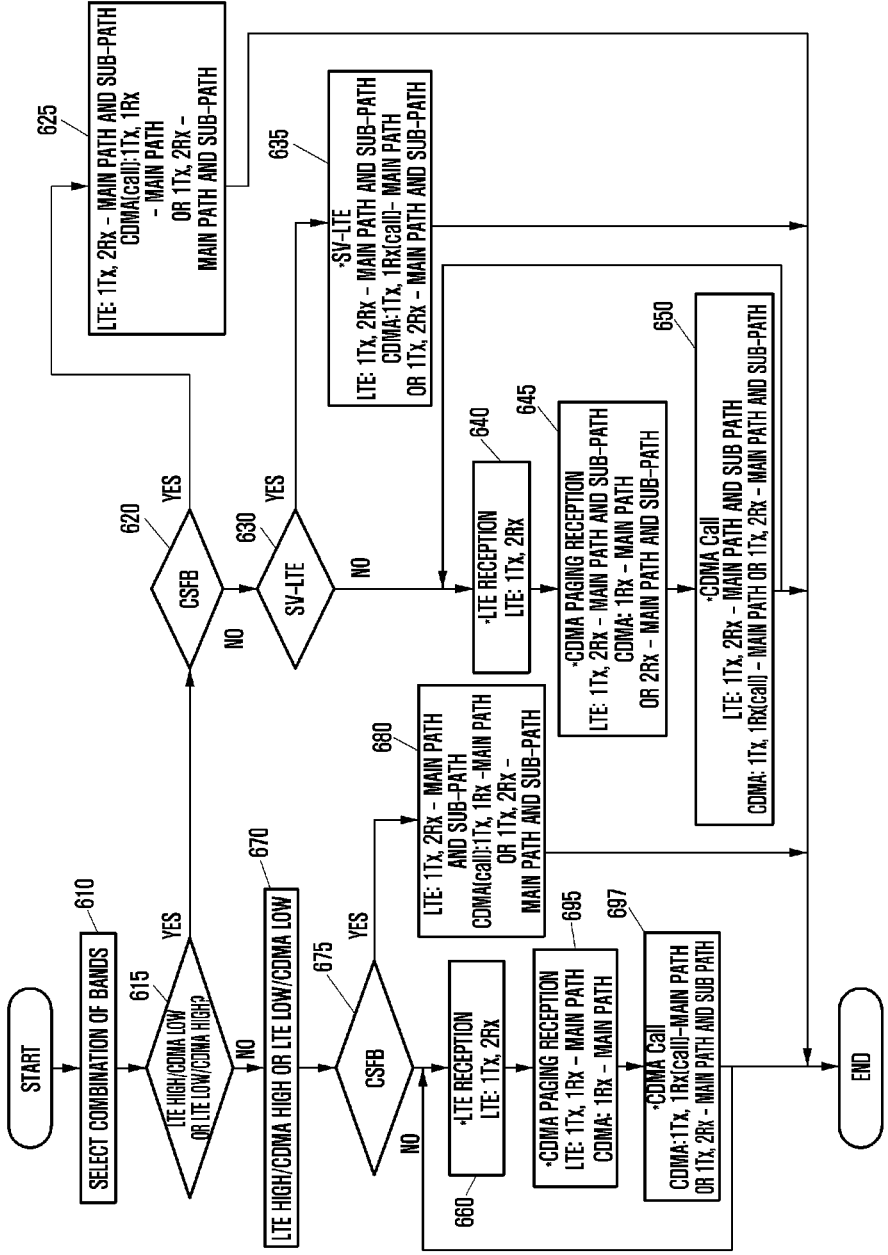
FIG. 6 is a flowchart illustrating a communication setting process of a communication apparatus according to various embodiments of the present disclosure.
Figure 7:
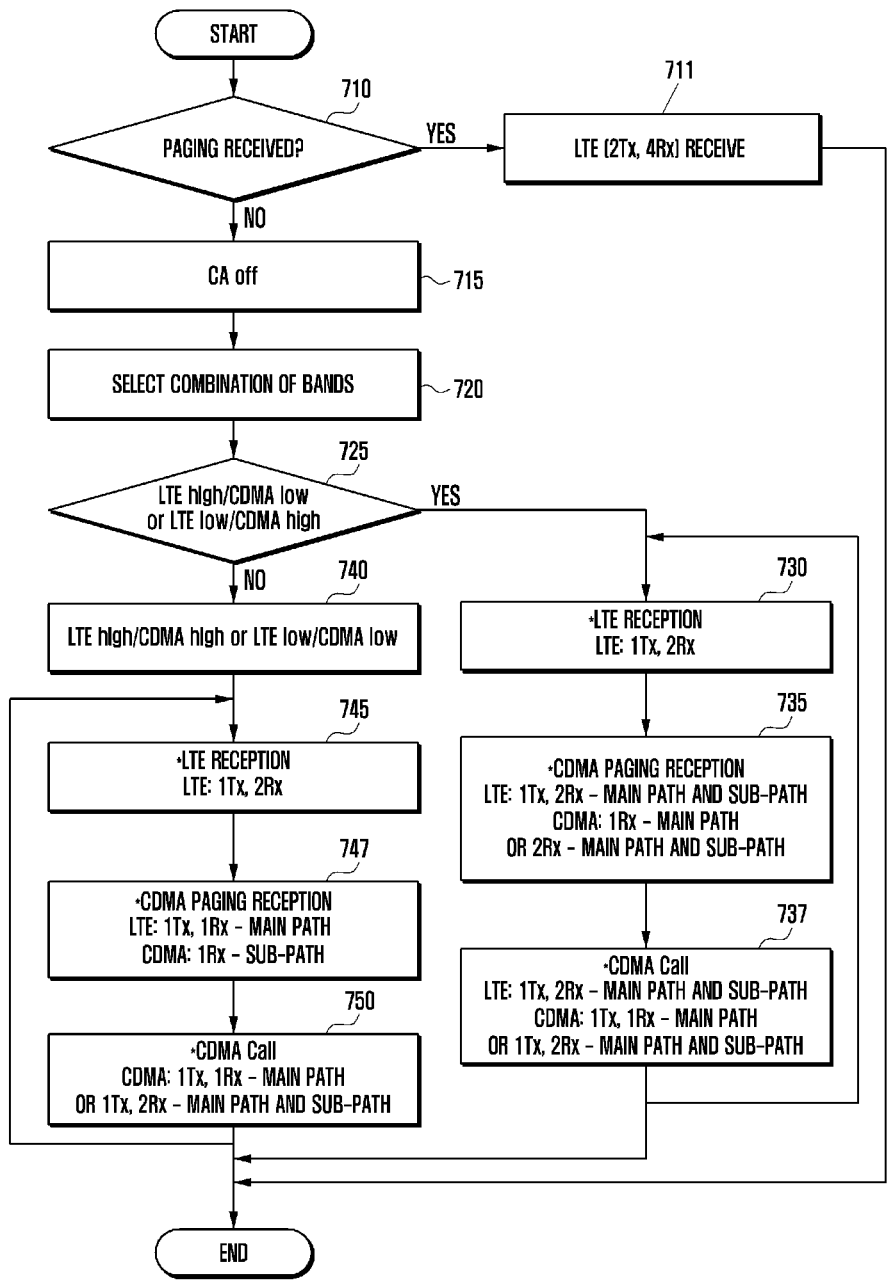
FIG. 7 is a flowchart illustrating a communication setting process of a communication apparatus according to various embodiments of the present disclosure.
Figure 8:
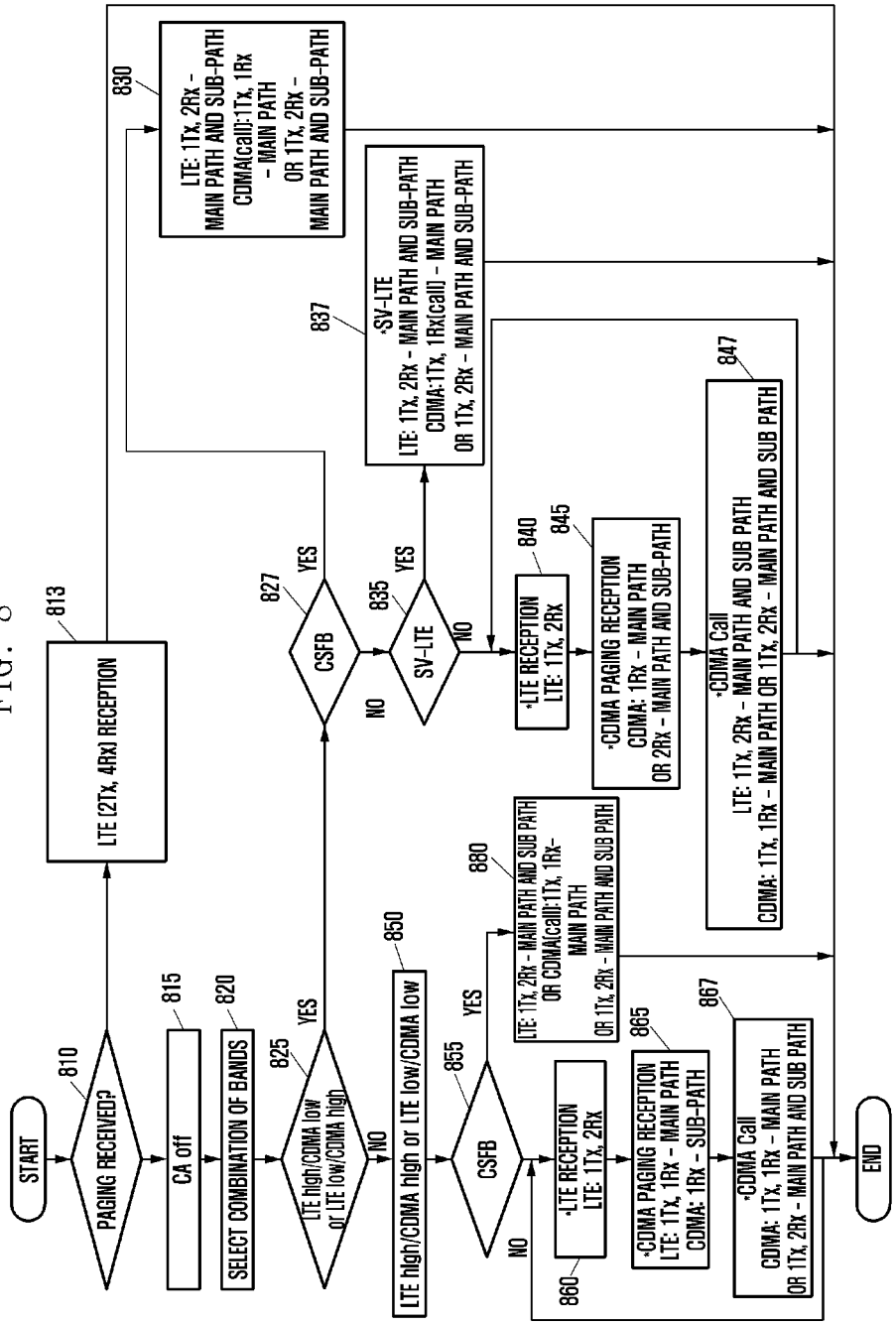
FIG. 8 is a flowchart illustrating a communication setting process of a communication apparatus according to various embodiments of the present disclosure.

Hereinafter, the setting operation of the communication apparatus of FIG. 2 according to detailed embodiment will be described with reference to FIGS. 5 to 8. FIGS. 5 and 6 illustrate a case where two main paths and one sub-path are set to be used, and FIGS. 7 and 8 illustrate a case where two main paths and two sub-paths are set to be used. Here, it is described that a combination of bands of a communication network corresponds to a communication network that supports a PS network (e.g., LTE network) and a CS network (CDMA network), but is not limited thereto.

FIG. 5 is a flowchart illustrating a communication setting process of a communication apparatus 200 according to various embodiments of the present disclosure.

Referring to FIG. 5, a communication apparatus according to an embodiment of the present disclosure may transmit/receive at least one of an LTE signal that requires two reception paths Rx, and signals of CDMA 850 and CDMA 1900.

At operation 510, the communication apparatus may select a combination of frequency bands of a communication signal that is provided by a communication network supporting an LTE network and CDMA 850/CDMA 1900 network. Here, the combination of frequency bands may be at least one of a combination of a high-band LTE signal and a low-band CDMA 90 signal, a combination of a low-band LTE signal and a high-band CDMA 1900 signal, and a combination of a high-band LTE signal and a high-band CDMA 1900 signal, or of a low-band LTE signal and a low-band CDMA 850 signal.

At operation 520, if the network supports a high-band LTE network and a low-band CDMA network (e.g., CDMA 850 network) or a low-band LTE network and a high-band CDMA network (e.g., CDMA 1900 network), the communication apparatus proceeds to operation 530 and may transmit/receive the LTE signal through two reception paths 2 Rx and one transmission path 1 Tx.

According to an embodiment, the communication apparatus may transmit/receive or receive and process the LTE signal through the main path and the sub-path. The main path may be one of the first main path Rx1 and Tx1 and the second main path Rx2 and Tx2, and the sub-path may be one of the first sub-path Rx3 and the second sub-path Rx4.

For example, since a signal of the high-band LTE network and a signal of the low-band CDMA network are separable through the diplexer, the communication apparatus may use one of the first main path and the second main path as a communication path of the LTE signal, and use the other as a communication path of the CDMA network. The communication apparatus may simultaneously receive the signal of the LTE network and the signal of low-band CDMA network (e.g., CDMA 850 network). According to an embodiment, since the communication apparatus may receive the LTE signal through one of two main paths and maintains a connection with the CDMA network through the other, the communication apparatus may receive a paging signal of the CDMA network if the paging signal is generated.

At operation 535, the communication apparatus may receive the paging signal of the CDMA network through the other main path (e.g., second main path) or receive the paging signal of the CDMA network through the other main path and the sub-path (e.g., the second main path and the first sub-path).

In an embodiment, the communication apparatus may receive the paging signal of the CDMA network while maintaining the connection with the PS network and two reception paths Rx. Accordingly, the communication apparatus may receive the paging signal of the CS network without deteriorating the reception performance through maintaining of the diversity gain of the PS network.

Thereafter, at operation 540, the communication apparatus receives LTE data through the first main path and the first sub-path, and if a phone call connection based on the CDMA network is required in response to the paging signal, the communication apparatus may transmit/receive a phone call connection signal to the main path (e.g., second main path). If there is a second sub-path, the communication apparatus may receive the phone call connection signal through the second main path and the second sub-path.

On the other hand, if the combination of the frequency bands is not the high/low combination, at operation 550, the communication apparatus may determine the combination of the frequency bands as a combination of the high-band LTE signal and the high-band CDMA (e.g., CDMA 1900) signal or a combination of the low-band LTE signal and the low-band CDMA (e.g., CDMA 850) signal.

At operation 555, the communication apparatus may transmit/receive the LTE signal through two reception paths and one transmission path.

According to an embodiment, if the frequency bands of the CDMA network signal and the LTE network signal are equal to each other, it may be difficult for the communication apparatus to separate the signals through the diplexer. In this case, the communication apparatus may transmit/receive the LTE signal using one of two main paths and the sub-path, and monitor the paging signal of the CDMA network through the sub-path.

For example, the communication apparatus may receive the LTE signal through the second antenna, and receive the signal of the CDMA network for a predetermined time in a predetermined period T. As another example, in a case of serving the signal of the PS network in a time division manner, the communication apparatus may receive the signal of the CDMA network in a section where the LTE signal is not received through the second antenna. For this, the communication apparatus may change the reception mode of the second antenna through a switching module to receive the monitored paging signal (paging signal of the CDMA network).

At operation 560, if the paging signal of the CDMA network is generated through the sub-path (e.g., first sub-path or second sub-path), the communication apparatus may receive the paging signal of the CDMA network through the sub-path. In this case, the communication apparatus may transmit/receive the LTE signal through main paths, i.e., one reception path and one transmission path.

At operation 565, if a phone call connection based on the CDMA network is required in response to the paging signal, the communication apparatus may transmit/receive a phone call connection signal through the main path (e.g., main path through which the LTE signal is received) or through the main path (e.g., main path through which the LTE signal is received) and the sub-path.

FIG. 6 is a flowchart illustrating a communication setting process of a communication apparatus 200 according to various embodiments of the present disclosure.

Referring to FIG. 6, at operation 610, the communication apparatus may select a combination of frequency bands of communication signals of an LTE network and a CDMA network.

At operation 615, if the combination of frequency bands is one of combinations of frequency bands of a high-band LTE network (e.g., TD-SCDMA) and a low-band CDMA network (e.g., CDMA 850) and of a low-band LTE network and a high-band CDMA network, the communication apparatus determines whether the corresponding network system supports a CSFB service at operation 620.

The communication apparatus according to an embodiment may request a communication system (or base station) that provides a communication service whether to support the CSFB service, and receive service support information from the communication system to confirm whether to support to CSFB service.

At operation 625, in a case of a network that supports the CSFB, the communication apparatus may transmit/receive the LTE signal through one of two main paths (e.g., first main path) and a sub-path (first sub-path) and transmit/receive the signal of the CDMA network through the other of the two main paths (e.g., second main path).

In this case, since a network service provider supports the CSB function, the communication apparatus receives the LTE signal through the diversity gain (e.g., 2 Rx), and if a voice call is received, the communication apparatus may transmit/receive a phone call connection signal using a main path (first main path or second main path) or through a main path (first main path or second main path) and a sub-path (first sub-path).

At operation 630, if the network system does not support the CSFB, the communication apparatus may determine whether the communication service of the network system is a SVLTE service. If the SVLTE service is supported, the communication apparatus proceeds to operation 635, and the LTE signal is transmitted/received through one of two main paths and a sub-path while the CDMA signal is transmitted/received through the other of the main paths. In this case, the communication apparatus may use the main path or receive the paging signal of the CDMA network through the main paths and the sub-path. Further, when a phone call based on the CDMA network is connected, the communication apparatus may use the main path or transmit/receive a phone call connection signal using the main path and the sub-path.

If the communication service of the network system is not the SVLTE service, the communication apparatus may proceed to operation 640 and transmit/receive the LTE signal through one of two main paths and a sub-path (e.g., 2 Rx and 1 Tx). In this case, the communication apparatus may receive the CDMA signal through the other of the two main paths.

At operation 645, if it is required to receive the paging signal for the CDMA network, the communication apparatus may transmit/receive the LTE signal through one of two main paths and a sub-path, and receive the paging signal for the CDMA network through the other of the two main paths.

Further, if it is required to receive the paging signal for the CDMA network, the communication apparatus may transmit/receive the LTE signal through one of two main paths and a sub-path (e.g., first sub-path) and receive the paging signal for the CDMA network through the other of two main paths and a sub-path (e.g., second sub-path).

At operation 650, the communication apparatus may receive LTE data through the first main path and the first sub-path, and if a phone call based on the CDMA network is connected in response to the paging signal, the communication apparatus may transmit/receive the signal for the phone call connection through the other of the two main paths. Further, the communication apparatus may transmit/receive the signal for the phone call connection through the other of the two main paths and the sub-path.

On the other hand, if the combination of the frequency bands is not the combination of the high-band LTE and the low-band CDMA or the combination of the low-band CDMA and the high-band CDMA, the communication apparatus may proceed to operation 670 and determine that the combination of the frequency bands is the combination of the high-band LTE signal and the high-band CDMA signal or the combination of the low-band LTE signal and the low-band CDMA signal.

At operation 675, the communication apparatus may determine whether the CSFB service is supported in a network system that provides a communication service through the combination of the high-band LTE signal and the high-band CDMA signal or the combination of the low-band LTE signal and the low-band CDMA signal.

If the network supports the CSFB, the communication apparatus may proceed to operation 680. In this case, the LTE signal may be transmitted/received through one of two main paths and a sub-path, and the signal of the CDMA network may be transmitted/received through the other of the two main paths. If a voice call is received while the LTE signal is received, the communication apparatus may transmit/receive a phone call connection signal based on the CDMA network that is received from the network through the main path (first main path or second main path).

If the phone call based on the CDMA network is connected, the communication apparatus may transmit/receive the phone call connection signal through the main path (one of the first and second main paths) and the sub-path.

If the network system does not support the CSFB, the communication apparatus may proceed to operation 660 and transmit/receive the LTE signal through one of the two main paths and the sub-path (first sub-path or second sub-path) (e.g., 2 Rx and 1 Tx).

At operation 695, the communication apparatus may monitor the CDMA signal using the sub-path (first sub-path or second sub-path) through the second antenna. If a paging signal of the CDMA network is generated, the communication apparatus may receive the paging signal of the CDMA network using the sub-path (first sub-path or second sub-path) through the second antenna.

At operation 697, if a phone call connection based on the CDMA network is required in response to the paging signal, the communication apparatus may transmit/receive a phone call connection signal through the main path (e.g., main path through which the LTE signal is received) or transmit/receive the phone call connection signal through the main path (e.g., main path through which the LTE signal is received) and the sub-path.

FIG. 7 is a flowchart illustrating a communication setting process of a communication apparatus 200 according to various embodiments of the present disclosure.

The communication apparatus according to an embodiment may support a network that provides a CA service for a specific communication network.

The communication apparatus that supports the CA communication service may simultaneously receive signals having different frequency bands with respect to the same communication network. For example, in a case of a LTE network that supports the CA service, the communication apparatus may receive the signals through two transmission/reception paths and two reception paths. The communication apparatus according to various embodiments of the present disclosure may simultaneously receive the signals having different frequency bands with respect to one communication network using the first antenna and the second antenna.

On the other hand, if a paging signal for the second communication network that uses a communication technology that is different from the communication technology of the first communication network is received, the communication apparatus 1000 may operate to change the CA mode to a normal mode. If the mode is changed to the normal mode, the setting operation of the communication apparatus becomes the same as the operation illustrated in FIGS. 5 and 6, and thus schematic explanation thereof will be made hereinafter.

Referring to FIG. 7, the communication apparatus according to an embodiment may be operated in a CA mode. Here, the CA mode means a mode in which signals from one communication network may be simultaneously received through a plurality of carriers using the first antenna and the second antenna. For example, in a case where the network system provides an LTE signal of a first frequency band (e.g., high band) and an LTE signal of a second frequency band (e.g., low band), the communication apparatus may simultaneously receive the LTE signal that is transmitted through carriers of the first frequency band and the LTE signal that is transmitted through carriers of the second frequency band using the first antenna and the second antenna. As an example as described above, the plurality of carriers may belong to the different frequency bands or have different frequencies in the same frequency band.

At operation 710, the communication apparatus may determine whether the paging signal for the second communication network (e.g., CDMA) that is different from the first communication network (e.g., LTE) that supports the CA communication is received. At operation 711, if the paging signal is not received, the communication apparatus may maintain to operate in a CA mode. In this case, the communication apparatus may transmit/receive the LTE signal having different frequency bands through two transmission/reception paths (2 Rx and Tx) allocated to the first antenna and two reception paths (2 Rx) allocated to the second antenna.

At operation 715, if it is required to receive the paging signal for a communication network that is different from the communication network that supports the CA, the communication apparatus may turn off the CA mode and operate in a normal mode.

At operation 720, the communication apparatus may select a combination of frequency bands of the communication signals provided to the communication network. Here, the combination of the frequency bands may include at least one of a combination of a high-band LTE signal and a low-band CDMA signal, a combination of a low-band LTE signal and a high-band CDMA signal, a combination of a high-band LTE signal and a high-band CDMA signal, and a combination of a low-band LTE signal and a low-band CDMA signal.

If the network supports a high-band LTE network and a low-band CDMA network (e.g., CDMA 850 network), or a low-band LTE network and a high-band CDMA network (e.g., CDMA 1900 network), the communication apparatus proceeds to operation 730 and may transmit/receive the LTE signal through two reception paths and one transmission path.

Hereinafter, since operations 735 and 737 are the same as operations 535 and 540, the detailed description thereof will be omitted.

On the other hand, if the combination of the frequency bands is not the high/low combination, at operation 725, it may be determined that the combination of the frequency bands is the combination of the high-band LTE signal and the high-band CDMA 1900 signal or the combination of the low-band LTE signal and the low-band CDMA signal.

Hereinafter since operations 745, 747 and 750 are the same as operations 555, 560 and 565, the detailed description thereof will be omitted.

FIG. 8 is a flowchart illustrating a communication setting process of a communication apparatus 200 according to various embodiments of the present disclosure.

Referring to FIG. 8, at operation 810, the communication apparatus may determine whether the paging signal for the communication network that is different from the communication network that supports the CA service is received, and if the paging signal is not received at operation 813, the communication apparatus may operate in the CA mode. In this case, the communication apparatus may transmit/receive the LTE signal having different frequency bands through two transmission/reception paths allocated to the first antenna and two reception paths allocated to the second antenna.

At operation 815, if it is required to receive the paging signal for the second network, the communication apparatus may turn off the CA mode and operate in a normal mode. Thereafter, at operation 820, the communication apparatus may select the combination of the frequency bands of the communication signals provided to the communication network.

At operation 825, if the combination of frequency bands is one of a combination of frequency bands of a high-band LTE network and a low-band CDMA network (e.g., CDMA 1900) and a combination of frequency bands of a low-band LTE network and a high-band CDMA network (e.g., CDMA 1900), the communication apparatus determines whether the corresponding network system supports the CSFB service at operation 827. Since operations 830, 835, 837, 840, 845 and 847 are the same as the operations 625, 630, 635, 640, 645 and 650, the detailed description thereof will be omitted.

On the other hand, if the combination of frequency bands is not the combination of high/low bands, at 825, the communication apparatus may determine that the combination of the frequency bands is one of the combination of frequency bands of a high-band LTE signal and a high-band CDMA signal (e.g., CDMA 1900) and the combination of frequency bands of the low-band LTE signal and the low-band CDMA signal (e.g., CDMA 850). Since operations 855, 860, 865 867 and 880 are the same as the operations 675, 660, 695, 697 and 680, the detailed description thereof will be omitted.

Figure 9:
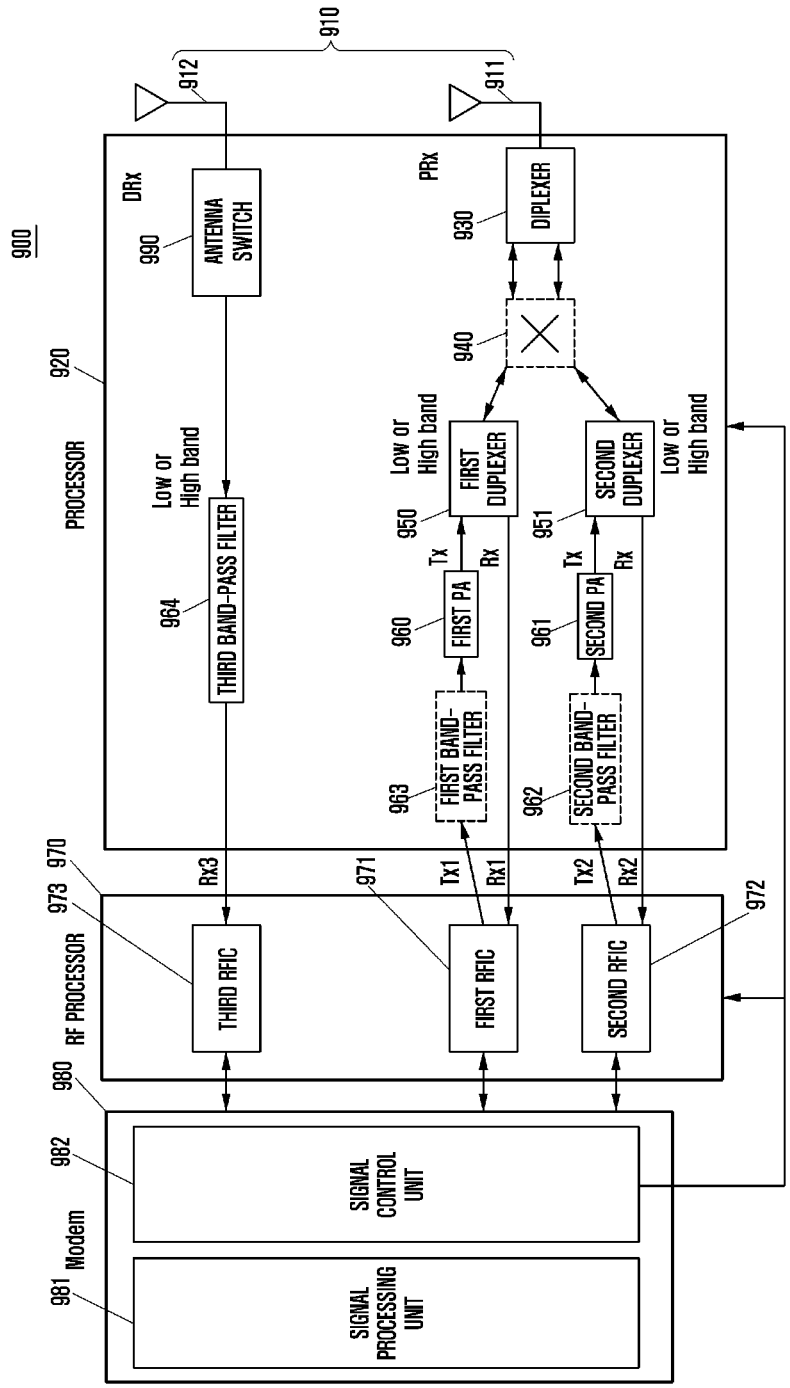
FIG. 9 is a block diagram illustrating the configuration of a communication apparatus according to various embodiments of the present disclosure.

FIG. 9 is a block diagram illustrating the configuration of a communication apparatus according to various embodiments of the present disclosure.

Referring to FIG. 9, a communication apparatus 900 according to an embodiment of the present disclosure may include an antenna 910, a preprocessor 920, an RF processor 970, and a modem 980. The detailed explanation of the configuration of the communication apparatus of FIG. 9 that is the same as or similar to the configuration of the communication apparatus 200 as described above with reference to FIG. 2 will be omitted.

The antenna 910 may include a first antenna 911 and a second antenna 912.

The first antenna 911 may be a transmission/reception antenna that may transmit/receive at least one of the signal of the first communication network and the signal of the second communication network, or may simultaneously or sequentially transmit or receive the signal of the first communication network and the signal of the second communication network. The first antenna 911 may be connected to a front end of a diplexer 930. An output port of the diplexer 930 may be connected to a front end of a reverse switch 940.

The second antenna 912 may be a reception antenna that may receive one of the signal of the first communication network and the signal of the second communication network. The second antenna 912 may be connected to a front end of an antenna switch 990, and an output port of the antenna switch 990 may be connected to a third band-pass filter 964.

The preprocessor 920 may include a diplexer 930, a reverse switch 940, a first duplexer 950, a second duplexer 951, the antenna switch 990, a plurality of amplifiers (a first PA 960 and a second PA 961), and a plurality of band-pass filters (a first band-pass filter 963, a second band-pass filter 962, and a third band-pass filter 964).

The diplexer 930 may be connected to the first antenna 911 and the reverse switch 940. An output port of the reverse switch 940 may be connected to front ends of the first duplexer 950 and the second duplexer 951. The diplexer 930 may separate a signal that is received from the first antenna based on a specific frequency and transmit the separated signals to the reverse switch 940.

The reverse switch 940 may be configured to reversely output the signals that are separated by the diplexer 930. The configuration of the reverse switch may be omitted, but is not limited thereto.

The reverse switch 940 may be configured by Double Pole Double Throw (DPDT). The reverse switch 940 may output the signals that are separated through the diplexer 930 to one of the first duplexer 950 and the second duplexer 951.

Reception terminals of the first duplexer 950 and the second duplexer 951 may be connected to the RF processor 970, and band-pass filters (e.g., a first band-pass filter 963 and a second band-pass filter 962) and amplifiers (e.g., a first PA 960 and a second PA 961) may be arranged between the RF processor 970 and the first and second duplexers 950 and 951.

The antenna switch 990 may be connected to the second antenna 912, and the output port of the antenna switch 990 may be connected to a third band-pass filter 964. The antenna switch 990 may pass a signal of a specific frequency band according to the setting thereof. The antenna switch 990 may change a reception mode of the second antenna 912 and receive one signal of signals of the first communication network and the second communication network through the second antenna.

For example, the second antenna 912 may receive at least one of a high-band PS network signal, a low-band PS network signal, a high-band CS network signal, and a low-band CS network signal. If it is required to receive only the high-band PS network signal, a signal control unit 982 may control the antenna switch 990 so that the mode of the antenna switch 990 is changed to a reception mode in which only the high-band PS network signal may be received.

According to an embodiment, the first main path Rx1 and Tx1 may be a transmission/reception path allocated to one of the high-band signal and the low-band signal, and the second main path Rx2 and Tx2 may be a transmission/reception path allocated to one of the high-band signal and the low-band signal. Further, the sub-path Rx3 may be a reception path allocated to one of the high-band signal and the low-band signal.

According to an embodiment, a communication signal received through the first antenna may be separated into high/low-band frequency bands through the diplexer 930, may be received in the first main path Rx1 and Tx1 connected to the output terminal of the second duplexer through the diplexer, or may be received in the second main path Rx2 and Tx2 connected to the output terminal of the second duplexer 951 through the diplexer.

The communication signal received through the second antenna may be received in the sub-path Rx3 that is connected to the third band-pass filter 964 through the reverse switch 990.

According to an embodiment, the RF processor 970 may be configured to include a first RFIC 971, a second RFIC 972, and a third RFIC 973.

The first RFIC 971 may process the signal that is transmitted/received through the first main path Rx1 and Tx1, and the second RFIC 972 may process the signal that is transmitted/received through the second main path Rx2 and Tx2. Further, the third RFIC may process the signal that is received through the sub-path Rx3, but is not limited thereto.

It is illustrated that the RF processor 970 according to an embodiment of the present disclosure is so configured that separate RFICs process the signals that are received through the main paths and the sub-paths, but is not limited thereto. The RF processor 970 may be configured as a combination of at least one RFIC.

Since the modem 980, the signal processing unit 981, and the signal control unit 982 are the same as those as described above with reference to FIG. 2, the detailed description thereof will be omitted.

Figure 10:
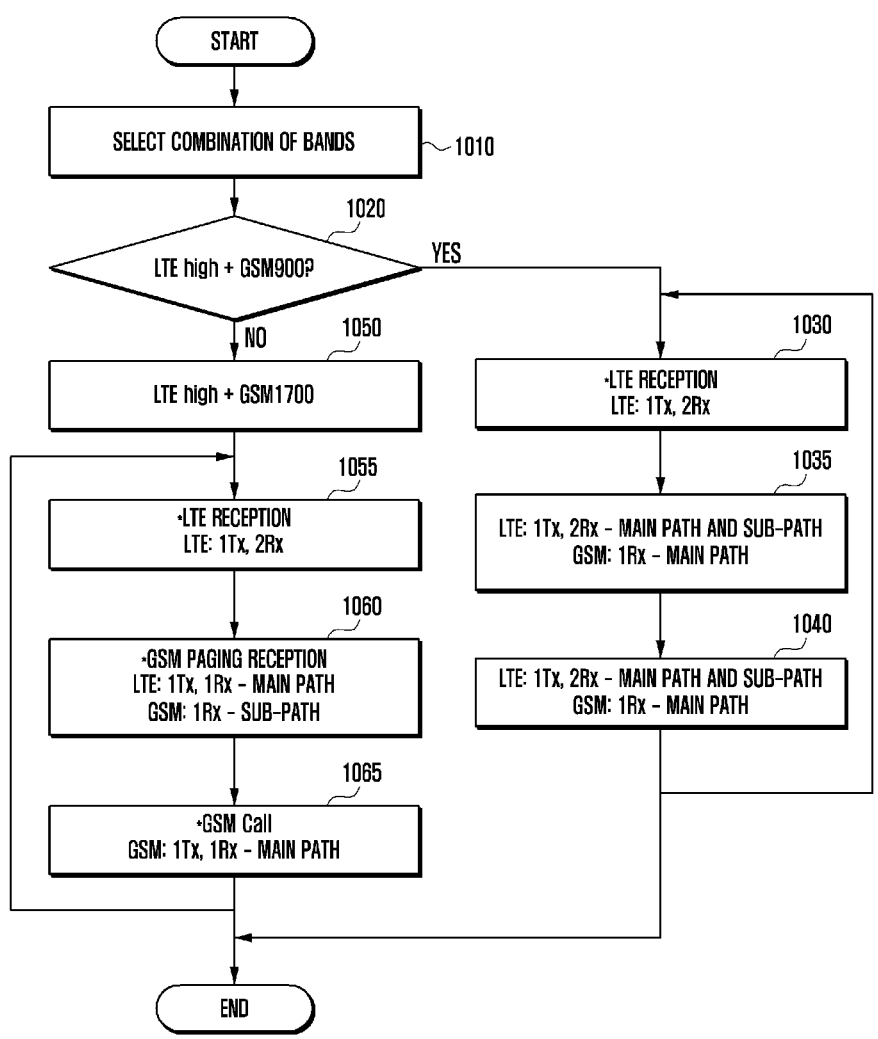
FIG. 10 is a flowchart illustrating a communication setting process of a communication apparatus according to various embodiments of the present disclosure.

FIG. 10 is a flowchart illustrating a communication setting process of a communication apparatus 900 (in FIG. 9) according to various embodiments of the present disclosure.

Referring to FIG. 10, a communication apparatus according to an embodiment of the present disclosure may transmit/receive at least one of an LTE signal that requires two reception paths 2 Rx, and signals of GSM 900 and GSM 1700.

At operation 1010, the communication apparatus may select a combination of frequency bands of communication signals provided by a communication network supporting an LTE network and a GSM 900/GSM 1700 network. Here, the combination of frequency bands may be at least one of a combination of a high-band LTE signal and a low-band GSM 900 signal and a combination of a high-band LTE signal and a high-band GSM 1700 signal.

At operation 1020, if the network supports a high-band LTE network and a low-band GSM network (e.g., GSM 900 network), the communication apparatus proceeds to operation 1030 and may transmit/receive the LTE signal through two reception paths 2 Rx and one transmission path 1 Tx. For example, the communication apparatus may transmit/receive the LTE signal through one of the first main path and the second main path of the first antenna and the sub-path through the second antenna.

In this case, the communication apparatus may receive a low-band GSM signal through the other main path of the first antenna. The communication apparatus may simultaneously receive the signal of the LTE network and the signal of the low-band GSM network.

The communication apparatus maintains a connection with the GSM network through the first antenna, and if a paging signal of the GSM network is generated through the first antenna, the communication apparatus may receive this. At operation 1035, the communication apparatus may receive the paging signal of the GSM network using the main path through the first antenna.

For example, the communication apparatus may receive the signal of the LTE network using one of two main paths and receive the paging signal of the GSM network using the other of the two main paths.

In an embodiment, since the communication apparatus is wirelessly connected to the GSM to transmit/receive signals, the communication apparatus may receive the paging signal for the GSM network while maintaining the connection to the first communication network through two reception paths 2 Rx.

Thereafter, at operation 1040, the communication apparatus may transmit/receive the LTE signal through two reception paths 2 Rx and one transmission path 1 Tx. In this case, if a phone call connection based on the GSM network is required in response to the paging signal, the communication apparatus may transmit/receive a phone call connection signal using the second main path through the first antenna.

On the other hand, if the combination of the frequency bands is not the combination of the high-band LTE and the low-band GSM network (GSM 900 network), at operation 1050, the communication apparatus may determine the combination as the combination of the high-band LTE signal and high-band GSM 1700 signal.

At operation 1055, the communication apparatus may transmit/receive the LTE signal through two reception paths 2 Rx and one transmission path 1 Tx.

For example, if the LTE network is of high band, the communication apparatus may transmit/receive the LTE signal through the first main path Rx1 and Tx1 allocated to high band and the sub-path Rx3. In this case, if the GSM network is of high band, the communication apparatus may monitor the paging signal for the GSM network through the sub-path Rx3.

For example, the communication apparatus may receive the LTE signal through the second antenna, and then receive the signal of the GSM network for a predetermined time in a predetermined period T. As another example, in a case of serving the signal of the PS network in a time division manner, the communication apparatus may receive the signal of the GSM network in a section where the LTE signal is not received through the second antenna. For this, the communication apparatus may change the reception mode of the second antenna through controlling of the antenna switch in order to receive the monitored paging signal (paging signal of the GSM network).

At operation 1060, if the paging signal of the GSM network is generated through the second antenna, the communication apparatus may receive the paging signal of the GSM network using the sub-path Rx3 through the second antenna. In this case, the signal of the PS network may be transmitted/received only through one reception path 1 Tx and one transmission path 1 Tx, for example, the first main path Rx1 and Tx1.

Thereafter, at operation 1065, if a phone call connection based on the GSM network is required in response to the paging signal, the communication apparatus may transmit/receive a phone call connection signal through the main path (e.g., main path through which the LTE signal is received).

Figure 11:
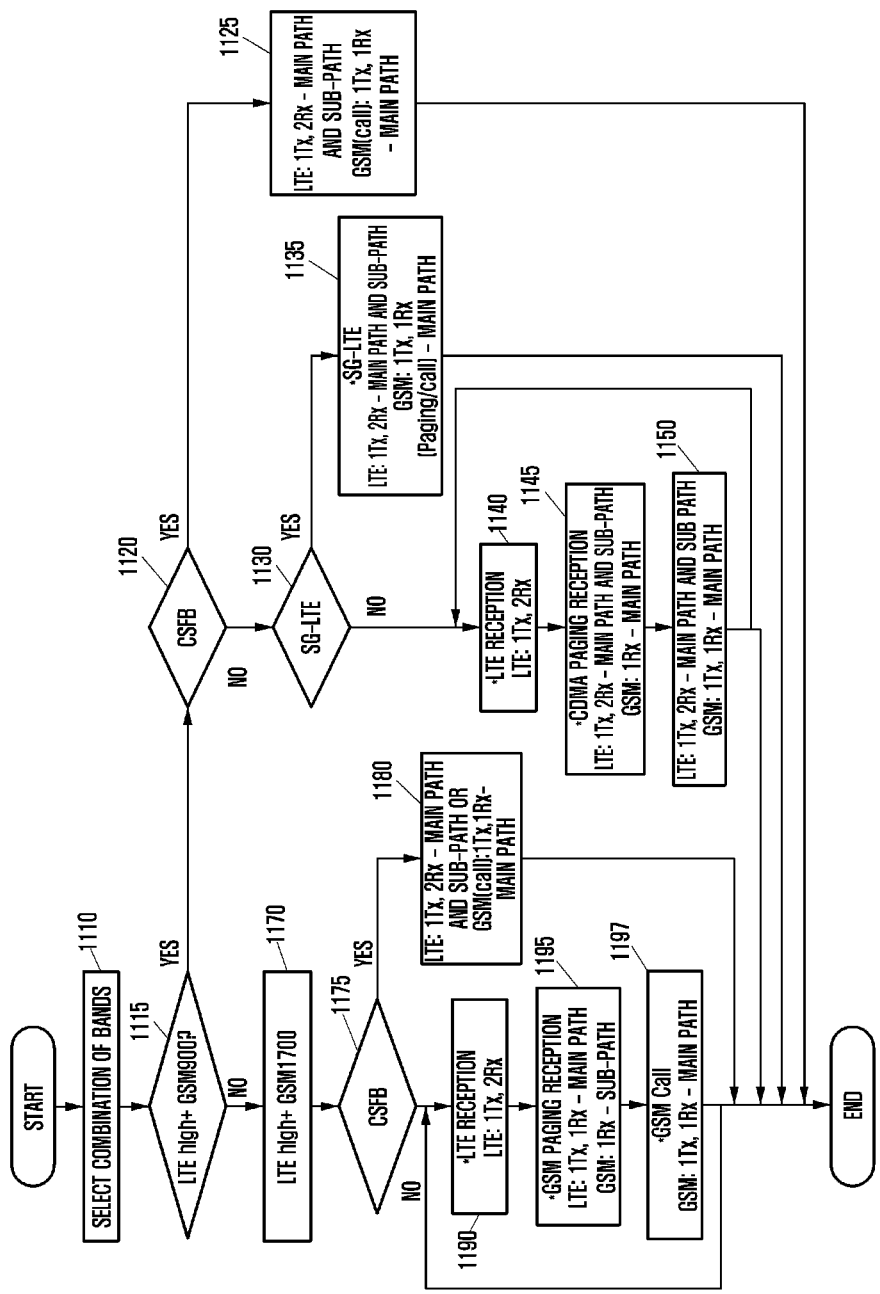
FIG. 11 is a flowchart illustrating a communication setting process of a communication apparatus according to various embodiments of the present disclosure.

FIG. 11 is a flowchart illustrating a communication setting process of a communication apparatus 900 (in FIG. 9) according to various embodiments of the present disclosure.

Referring to FIG. 11, at operation 1110, the communication apparatus may select a combination of frequency bands of communication signals of an LTE network and a GSM network.

At operation 1115, if the combination of frequency bands is a combination of a high-band LTE network and a low-band GSM network (e.g., GSM 900), the communication apparatus determines whether the corresponding network system supports a CSFB service at operation 1120.

At operation 1125, if the network supports the CSFB, the communication apparatus may transmit/receive the LTE signal through two reception paths 2Tx and one transmission path 1 Tx.

According to an embodiment, the communication apparatus may transmit/receive the LTE signal through one of two main paths and a sub-path, and transmit/receive the GSM signal through the other of the two main paths. If a network service provider supports the CSFB function, the communication apparatus may receive the LTE signal through the diversity gain (e.g., two Rx), and if a voice call is received, the communication apparatus may transmit/receive a phone call connection signal using a main path allocated to the path of the GSM signal.

Exemplarily, the LTE signal is allocated to the first main path Rx1 and Tx1 and the GSM signal is allocated to the second main path Rx2 and Tx2, but are not limited thereto. The LTE signal may be allocated to the second main path Rx2 and Tx2, and the GSM signal may be allocated to the first main path Rx1 and Tx1.

At operation 1120, if the network system does not support the CSFB, the communication apparatus proceeds to operation 1130 and determines whether the communication service of the network system is a SGLTE service. If the SGLTE service is supported, the communication apparatus proceeds to operation 1135, and the LTE signal may be transmitted/received through the first main path Rx1 and Tx1 and the sub-path Rx3 while the GSM signal may be transmitted/received through the second main path Rx2 and Tx2.

In this case, the communication apparatus may receive the paging signal of the GSM network through the second main path Rx2 and Tx2, and when a phone call based on the GSM network is connected, the communication apparatus may transmit/receive a phone call connection signal using the second main path Rx2 and Tx2.

If the communication service is not the SGLTE service, the communication apparatus may proceed to operation 1140 and transmit/receive the LTE signal through the first main path Rx1 and Tx1 and the sub-path Rx3. In this case, the communication apparatus may receive the GSM signal using the second main path Rx2 and Tx2 through the first antenna.

At operation 1145, if it is required to receive the paging signal for the GSM network, the communication apparatus may transmit/receive the LTE signal through the first main path Rx1 and Tx1, and receive the paging signal for the GSM network through the second main path Rx2 and Tx2.

At operation 1150, if it is intended to connect a phone call based on the GSM network in response to the paging signal, the communication apparatus may transmit/receive a signal for phone call connection through the second main path Rx2 and Tx2.

On the other hand, at operation 1115 if the combination of the frequency bands is not the combination of the high-band LTE and the high-band GSM 900, at operation 1170, the communication apparatus may determine that the combination of the frequency bands is the combination of the high-band LTE signal and the high-band GSM signal (e.g., GSM 1700). At operation 1175, the communication apparatus may determine whether the CSFB service is supported in a network system that provides a communication service through the combination of the high-band LTE signal and the high-band GSM signal. At operation 1175, if the network supports the CSFB, the communication apparatus may proceed to operation 1180. In this case, the LTE signal may be transmitted/received through the first main path Rx1 and Tx1 and the sub-path Rx3, and the signal of the GSM network may be transmitted/received through the second main path Rx2 and Tx2. If a voice call is received while the LTE signal is received, the communication apparatus may transmit/receive a phone call connection signal based on the signal of the GSM network that is received from the network through the second main path Rx2 and Tx2.

If the network system does not support the CSFB, the communication apparatus may proceed to operation 1190 and transmit/receive the LTE signal through the first main path Rx1 and Tx1 and the sub-path Rx3. At this time, the communication apparatus may monitor the GSM signal using the sub-path Rx3 through the second antenna. If a paging signal of the GSM network is generated, the communication apparatus may receive the paging signal of the GSM network using the sub-path Rx3 through the second antenna. At operation 1195, if it is required to receive the paging signal for the GSM network, the communication apparatus may transmit/receive the LTE signal through the first main path Rx1 and Tx1 and receive the paging signal for the GSM network through the sub-path Rx3.

At operation 1197, if a phone call connection based on the GSM network is required in response to the paging signal, the communication apparatus may transmit/receive a phone call connection signal through the first main path Rx1 and Tx1 of the first antenna.

Figure 12:
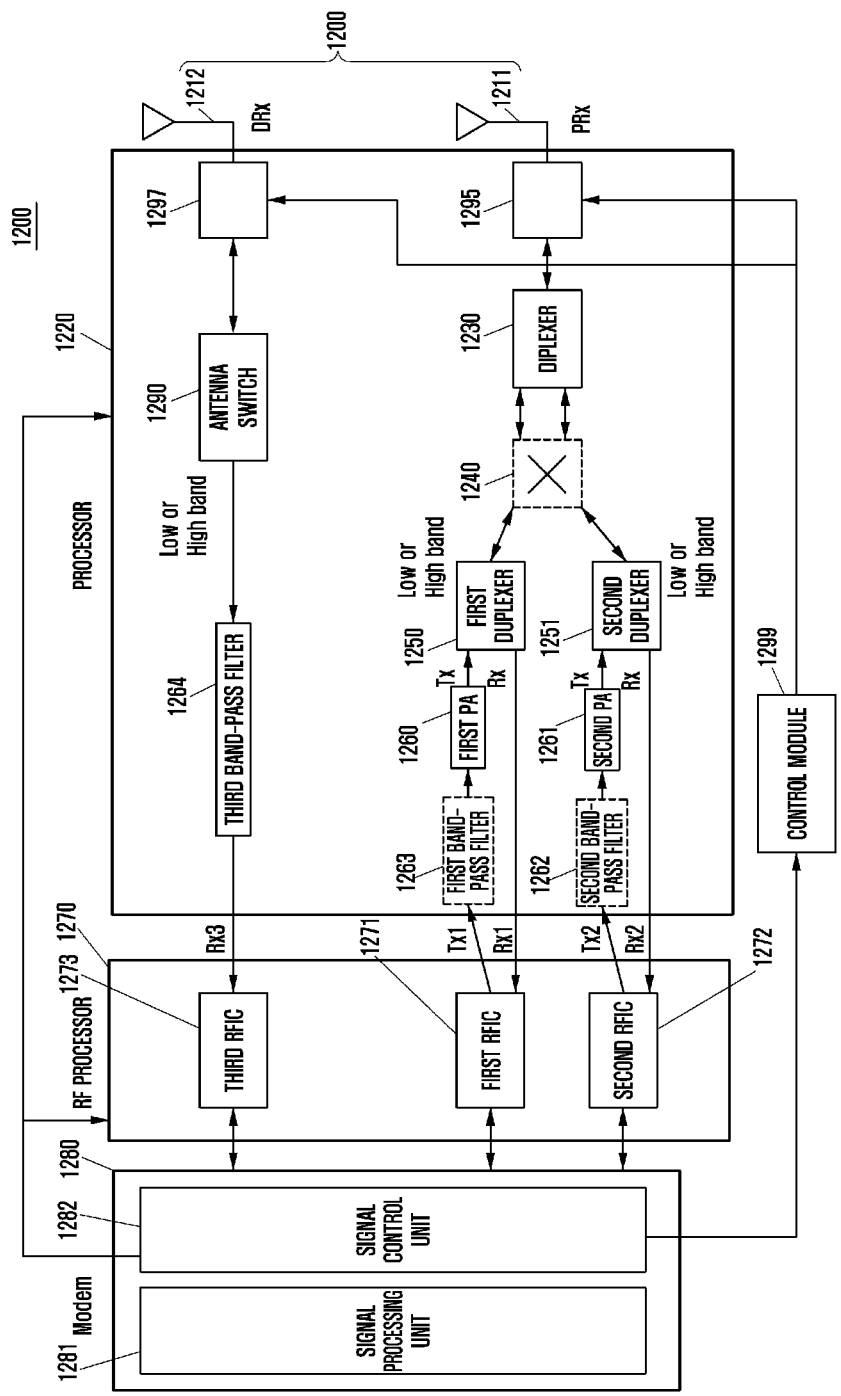
FIG. 12 is a block diagram illustrating the configuration of a communication apparatus according to various embodiments of the present disclosure.

FIG. 12 is a block diagram illustrating the configuration of a communication apparatus according to various embodiments of the present disclosure.

Referring to FIG. 12, a communication apparatus 1200 according to an embodiment of the present disclosure may include an antenna 1210, a preprocessor 1220, an RF processor 1270, a modem 1280, and a control module 1299. The detailed explanation of the configuration of the communication apparatus of FIG. 12 that is the same as or similar to the configuration of the communication apparatus 900 as described above with reference to FIG. 9 will be omitted.

A first tuning module 1295 may be arranged between a first antenna 1211 and a diplexer 1230, and a second tuning module 1297 may be arranged between a second antenna 1212 and an antenna switch 1290.

The first tuning module 1295 and the second tuning module 1297 may be configurations to match an appropriate antenna matching value (e.g., impedance value) to a signal that is received through the antenna 1210 according to the frequency bands of the corresponding signal. The control module 1299 may be configured to control the first tuning module 1295 and the second tuning module 1297. A signal control unit 1282 may set an impedance value according to the change of frequencies of the signal that is received through the antenna, and transfer the impedance value to the control module 1299.

For example, if the LTE signal is received through the first antenna 1211, the first tuning module 1295 may use the antenna matching value that meets the frequency bands of the LTE signal under the control of the signal control unit 1282. Further, if a GSM signal or a CDMA signal is received through the first antenna 1211, the first tuning module 1295 may use the antenna matching value that meets the frequency bands of the GSM signal or the CDMA signal under the control of the signal control unit 1282.

If the reception mode of the second antenna 1212 is changed, the second tuning module 1297 may use the antenna matching value that meets the frequency bands corresponding to the changed reception mode under the control of the signal control unit 1282.

It is described that the first tuning module 1295 and the second tuning module 1297 according to an embodiment of the present disclosure are included in the configuration of the electronic device of FIG. 12. According to various embodiments, the first tuning module and the second tuning module respectively connected to the first antenna and the second antenna may also be included even in the electronic devices of FIGS. 2 and 9.

The diplexer 1230, reverse switch 1240, antenna switch 1290, first duplexer 1250, second duplexer 1251, RF processor 1270, first, second and third RFICs 1271, 1272 and 1273, first PA 1260 and a second PA 1261, first band-pass filter 1263, second band-pass filter 1262, third band-pass filter 1264, signal processing unit 1281, and signal control unit 1282 are the same as those of the configuration as described above with reference to FIG. 9.

Figure 13:
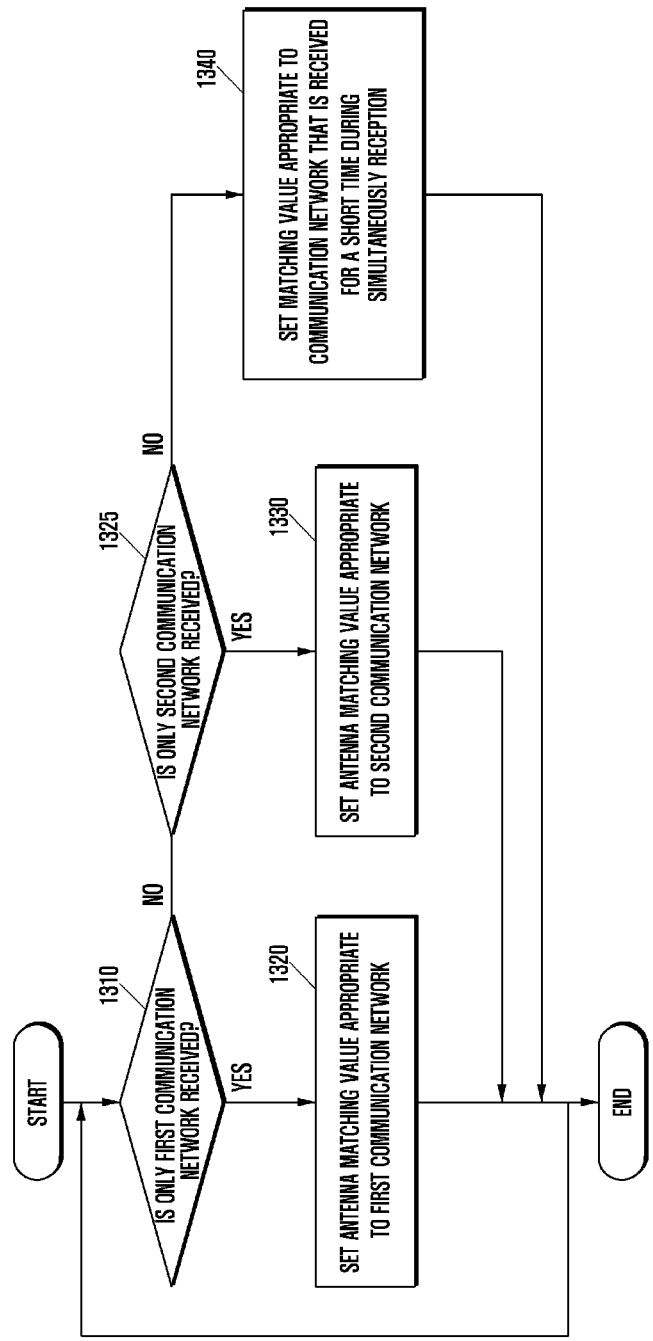
FIG. 13 is a flowchart illustrating a communication setting process of a communication apparatus according to various embodiments of the present disclosure.

FIG. 13 is a flowchart illustrating a communication setting process of a communication apparatus 1200 (in FIG. 12) according to various embodiments of the present disclosure.

Referring to FIG. 13, the operation of the signal control module that controls the tuning module in the electronic device will be described. At operation 1310, the signal control module may solely determine whether a signal of a first communication network is received. In this case, the signal of the first communication network may be received from one of a first antenna and a second antenna. At operation 1320, if a signal for the first communication network is received, the signal control module may set the antenna matching value that is appropriate to the frequency bands of the signal of the first communication network. The signal control module may control the tuning module that is connected to one of the first antenna and the second antenna, which may receive the signal of the first communication network.

At operation 1325, the signal control module may solely determine whether a signal of a second communication network is received, which adopts a communication technology that is different from the communication technology of the first communication network. In this case, the signal of the second communication network may be received through one of the first antenna and the second antenna. At operation 1330, if the signal of the second communication network is received, the control module may set the antenna matching value that is appropriate to the frequency bands of the signal of the second communication network. The signal control module may control the tuning module that is connected to one of the first antenna and the second antenna, which may receive the signal of the second communication network. At operation 1340, if the signals of the first communication network and the second communication network are simultaneously received, the signal control module may set the antenna matching value that is appropriate to the signal of the frequency band that is received for a relatively short time. In this case, signals of the first communication network and the second communication network may be received in at least one of the first antenna and the second antenna.

For example, the communication apparatus may simultaneously receive the signals of the first communication network and the second communication network through the first antenna. In this case, the signal of the first communication network may be periodically received for a first signal, and the signal of the second communication network may be temporarily received for a second time that is longer than the first time. The signal control module may set the matching value of the first antenna to the antenna matching value that is appropriate to the frequency band of the signal of the first communication network that is received for a shorter time than the time for which the signal of the second communication network is received, and thus the antenna performance may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication apparatus comprising:
a first antenna configured to transmit and receive at least one of a signal of a first communication network and a signal of a second communication network;
a second antenna configured to receive one of the signal of the first communication network and the signal of the second communication network;
a first diplexer connected to the first antenna and configured to separate the signal that is received through the first antenna into a high-band signal and a low-band signal based on a specific frequency and to output the separated signals;
an RF processor configured to perform analog signal processing of a signal that is received through at least one of the first antenna and the second antenna and a signal that is transmitted through the first antenna; and
a modem connected to the RF processor and configured to perform data communication,
wherein the RF processor is further configured to support at least one of a communication technology according to a first communication type and a communication technology according to a second communication type, and is composed of a combination of at least one radio frequency integrated circuit (RFIC).

2. The communication apparatus of claim 1, further comprising;
a first duplexer and a second duplexer connected to the first diplexer and configured to receive one of the high-band signal and the low-band signal and to separately input and output a received signal and a transmitted signal,
wherein the RF processor is connected to the first duplexer and the second duplexer, and
wherein the modem includes a signal processor configured to perform digital processing of an analog signal and a signal control unit configured to change communication paths of the high-band signal, the low-band signal, and the signal that is received through the second antenna according to a combination of frequency bands supported in a network.

3. The communication apparatus of claim 2, further comprising an antenna switch connected to the second antenna and configured to pass a signal of a specific frequency band according to a communication setting mode.

4. The communication apparatus of claim 3, wherein, if the frequency band that the network supports corresponds to a high/low combination, the signal control unit is further configured to:
receive the signal of the first communication network using one of the first duplexer and the second duplexer that is connected to the first antenna, and
receive the signal of the second communication network using the other of the first duplexer and the second duplexer that is connected to the first antenna.

5. The communication apparatus of claim 4, wherein the signal control unit is further configured to transmit and receive a voice call signal through the first antenna using the other of the first duplexer and the second duplexer that is connected to the first antenna when a call based on the second communication network is connected after a paging signal of the second communication network is received.

6. The communication apparatus of claim 3, wherein, if the frequency band that the network supports corresponds to one of a high/high and low/low combination, the signal control unit is further configured to:
receive the signal of the first communication network using one of the first duplexer and the second duplexer connected to the first antenna and the second antenna, and
monitor a paging signal of the second communication network using the second antenna.

7. The communication apparatus of claim 6, wherein, if a call based on the second communication network is connected, the signal control unit is further configured to:
change a reception path of the first communication network connected to the first antenna to a reception path of the second communication network, and
transmit and receive a voice call signal using the changed reception path.

8. The communication apparatus of claim 2, further comprising a second diplexer connected to the second antenna and configured to separate the signal that is received through the second antenna into a high-band signal and a low-band signal based on a specific frequency and to output the separated signals.

9. The communication apparatus of claim 8, further comprising:
a first reverse switch connected to an output terminal of the first diplexer and arranged at front ends of the first duplexer and the second duplexer and configured to reverse output the signals separated by the first diplexer; and
a second reverse switch connected to an output terminal of the second diplexer and configured to reverse output the signals separated by the second diplexer.

10. The communication apparatus of claim 8, wherein, if the frequency band that the network supports corresponds to a high/low signal, the signal control unit is further configured to:
receive the signal of the first communication network using one of the first duplexer and the second duplexer that is connected to the first antenna, and
receive the signal of the second communication network using the other of the first duplexer and the second duplexer that is connected to the first antenna.

11. The communication apparatus of claim 9,
wherein the signal control unit is further configured to receive a paging signal of the second communication network through one of the first antenna and using at least one of the first antenna and the second antenna, and
wherein, if a call based on the second communication network is connected, the signal control unit is further configured to transmit and receive a voice call signal using at least one of the first antenna and the second antenna.

12. The communication apparatus of claim 8, wherein, if the frequency band that the network supports corresponds to one of a high/high combination and a low/low combination, the signal control unit is further configured to:
receive the signal of the first communication network using one of the first duplexer and the second duplexer connected to the first antenna and the second antenna, and
monitor a paging signal of the second communication network through the second antenna.

13. The communication apparatus of claim 12,
wherein the signal control unit is further configured to receive a paging signal of the second communication network through one of the first antenna and using at least one of the first antenna and the second antenna, and wherein, if a call based on the second communication network is connected, the signal control unit is further configured to:
  change a reception path of the first communication network connected to the first antenna to a reception path of the second communication network and to transmit, and
  receive a voice call signal using at least one of the first antenna and the second antenna.

14. The communication apparatus of claim 11, wherein the signal control unit is further configured to monitor a paging signal of the second communication network through changing of the frequency band of the signal that is received from the second antenna according to one of a preset period and a preset rule.

15. The communication apparatus of claim 8,
  wherein if a paging signal of the second communication network is not received, the signal control unit is further configured to simultaneously receive the signal of the first communication network having different frequency bands through the first antenna and the second antenna, and
  wherein, if the paging signal of the second communication network is received, the signal control unit is further configured to:
    interrupt the simultaneous reception of the signal of the first communication network having the different frequency bands, and
    change communication paths of the signals that are received through the first antenna and the second antenna according to a combination of frequency bands of the first communication network and the second communication network.

16. The communication apparatus of claim 1, further comprising at least one tuning module connected to the first antenna and the second antenna and configured to match an antenna matching value according to frequency bands of the signals received through the first antenna and the second antenna.

17. The communication apparatus of claim 1, wherein if the signal is received from at least one of the first antenna and the second antenna, the signal control unit is further configured to control a tuning module to set an antenna matching value of the at least one of the first antenna and the second antenna according to a frequency change of the received signal.

18. A communication method comprising:
  confirming a combination of frequency bands of networks that provide services of different communication types;
  separating a signal that is received through a first antenna into a high-band signal and a low-band signal based on a specific frequency; and
  performing analog signal processing of a signal that is received through at least one of the first antenna and a second antenna and a signal that is transmitted through the first antenna,
  wherein the performing of the analog signal processing supports at least one of a communication technology according to a first communication type and a communication technology according to a second communication type, and is performed by a combination of at least one radio frequency integrated circuit (RFIC).

19. The communication method of claim 18, further comprising receiving the signal of at least one of a first communication network and a second communication network through the first antenna and the second antenna,
  wherein the receiving of the signal of the at least one of the first communication network and the second communication network through the first antenna and the second antenna includes, if the frequency band that the network supports corresponds to a high/low signal, receiving a signal of the first communication network through the first antenna and the second antenna and receiving a signal of the second communication network through the first antenna.

20. The communication method of claim 18, further comprising receiving a paging signal of a first communication network through the first antenna, and if a call based on the first communication network is connected, transmitting and receiving a voice call signal using at least one of the first antenna and the second antenna.

21. The communication method of claim 18, further comprising receiving a signal of at least one of a first communication network and a second communication network through the first antenna and the second antenna,
  wherein the receiving of the signal includes, if the frequency band that the network supports corresponds to a high/low signal:
    receiving the signal of the first communication network through the first antenna and the second antenna, and
    monitoring a paging signal of the second communication network through at least one of the first antenna and the second antenna.

22. The communication method of claim 21, further comprising:
  changing the frequency band of the signal that is received from the second antenna to monitor the paging signal of a Circuit Switching (CS) network according to one of a preset period and a preset rule before receiving the paging signal of the second communication network; and
  transmitting, if a call based on the first communication network that is based on the second communication network, and receiving a voice call signal through at least one of the first antenna and the second antenna.

23. The communication method of claim 18, wherein the receiving of the signal comprises matching and receiving an antenna impedance value according to the frequency band of the signal received through the first antenna and the second antenna.

24. The communication method of claim 18, further comprising:
  receiving, if the frequency bands correspond to a high/low combination, a signal of a first communication network through a first main path and a first sub-path; and
  receiving, if the frequency bands correspond to the high/low combination, a signal of the second network through a second main path.

* * * * *